United States Patent
Dabeer et al.

(10) Patent No.: US 9,872,313 B2
(45) Date of Patent: Jan. 16, 2018

(54) CONTENTION BASED UPLINK TRANSMISSIONS FOR LATENCY REDUCTION

(71) Applicant: QUALCOMM Incorporated, San Diego, CA (US)

(72) Inventors: Onkar Jayant Dabeer, San Diego, CA (US); Aleksandar Damnjanovic, Del Mar, CA (US); Jelena Damnjanovic, Del Mar, CA (US); Madhavan Srinivasan Vajapeyam, San Diego, CA (US); Ozcan Ozturk, San Diego, CA (US); Hao Xu, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 14/856,374

(22) Filed: Sep. 16, 2015

(65) Prior Publication Data

US 2016/0100430 A1    Apr. 7, 2016

Related U.S. Application Data

(60) Provisional application No. 62/058,815, filed on Oct. 2, 2014, provisional application No. 62/058,798, filed on Oct. 2, 2014.

(51) Int. Cl.
*H04W 72/04*    (2009.01)
*H04W 72/12*    (2009.01)
(Continued)

(52) U.S. Cl.
CPC ....... *H04W 74/08* (2013.01); *H04W 28/0278* (2013.01); *H04W 72/042* (2013.01);
(Continued)

(58) Field of Classification Search
CPC .......... H04W 28/0278; H04W 72/042; H04W 72/08; H04W 72/14; H04W 74/08; H04W 72/1284
See application file for complete search history.

(56) References Cited

U.S. PATENT DOCUMENTS

2011/0039568 A1*  2/2011  Zhang ................... H04W 52/50
                                                           455/452.1
2011/0170515 A1   7/2011  Kim
(Continued)

FOREIGN PATENT DOCUMENTS

WO    WO-2011019813 A2    2/2011
WO    WO-2011038780 A1    4/2011

OTHER PUBLICATIONS

ISA/EPO, International Search Report and Written Opinion of the International Searching Authority, Int'l App. No. PCT/US2015/050761, dated Nov. 23, 2015, European Patent Office, Rijswijk, NL, 12 pgs.

*Primary Examiner* — Brian D Nguyen

(57) ABSTRACT

Contention-based uplink communications within a wireless communications system are provided in which a user equipment (UE) may transmit data to a base station autonomously, and thereby reduce delay with established procedures for allocating uplink resources to a UE. A base station may allocate contention-based uplink resources from a set of available uplink resources. A UE may determine that data is to be transmitted using contention-based uplink resources, identify available contention-based resources allocated by the base station, and may autonomously transmit the data using the allocated contention-based resources. The contention-based uplink resources may include a subset of available physical uplink shared channel (PUSCH) resources. The contention-based PUSCH resources may include allo-
(Continued)

cated bins, and a UE may select CB-PUSCH resources from one of the bins for transmission of the uplink data.

26 Claims, 16 Drawing Sheets

(51) Int. Cl.
*H04W 72/14* (2009.01)
*H04W 74/08* (2009.01)
*H04W 28/02* (2009.01)
*H04W 72/08* (2009.01)

(52) U.S. Cl.
CPC ....... *H04W 72/08* (2013.01); *H04W 72/1284* (2013.01); *H04W 72/14* (2013.01)

(56) References Cited

U.S. PATENT DOCUMENTS

| | | | |
|---|---|---|---|
| 2011/0176500 A1* | 7/2011 | Wager | H04W 74/006 370/329 |
| 2011/0216722 A1* | 9/2011 | Yang | H04L 1/0041 370/329 |
| 2011/0263286 A1 | 10/2011 | Damnjanovic et al. | |
| 2011/0292895 A1* | 12/2011 | Wager | H04L 5/0007 370/329 |
| 2011/0321050 A1 | 12/2011 | Ho et al. | |
| 2012/0163322 A1* | 6/2012 | Larmo | H04L 1/1854 370/329 |
| 2012/0236816 A1* | 9/2012 | Park | H04W 74/08 370/329 |
| 2012/0287877 A1 | 11/2012 | Han et al. | |
| 2013/0107838 A1* | 5/2013 | Li | H04W 74/0866 370/329 |
| 2013/0163533 A1* | 6/2013 | Anderson | H04W 72/04 370/329 |
| 2013/0272212 A1* | 10/2013 | Tabet | H04W 36/0066 370/329 |
| 2014/0254511 A1* | 9/2014 | Aldana | H04W 56/003 370/329 |
| 2014/0328183 A1* | 11/2014 | Au | H04W 28/0284 370/237 |

\* cited by examiner

CONTENTION BASED UPLINK TRANSMISSIONS FOR LATENCY REDUCTION

CROSS REFERENCES

The present application for patent claims priority to U.S. Provisional Patent Application No. 62/058,815 by Dabeer et al., entitled "Contention Based Uplink Transmissions for Latency Reduction," filed Oct. 2, 2014, and to U.S. Provisional Patent Application No. 62/058,798 by Dabeer et al., entitled "Contention Based Uplink Transmissions for Latency Reduction," filed Oct. 2, 2014 assigned to the assignee hereof, and expressly incorporated by reference herein.

BACKGROUND

Field of the Disclosure

The present disclosure, for example, relates to wireless communication systems, and more particularly to contention-based uplink transmissions for latency reduction.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some instances, transmissions between mobile devices and base stations are initiated through established scheduling request procedures that result in a base station granting uplink resources to a mobile device that the mobile device may use in a subsequent transmission time interval to transmit uplink data. In some scenarios, however, the overall delay associated with transmitting information indicating that uplink resources are needed for data transmission and subsequently receiving a grant of uplink resources may cause certain inefficiencies in wireless communications.

SUMMARY

The described features generally relate to one or more improved systems, methods, and/or devices for initiating uplink communications within a wireless communications system. In some examples, contention-based uplink transmission techniques may provide a user equipment (UE) with an ability to transmit data to a base station autonomously, and thereby reduce delay with established procedures for allocating uplink resources to a UE. A base station, in some examples, may allocate contention-based uplink resources from a set of available uplink resources. A UE may determine that data is to be transmitted using contention-based uplink resources, identify available contention-based resources allocated by the base station, and may autonomously transmit the data using the allocated contention-based resources. The contention-based uplink resources may include a subset of available physical uplink shared channel (PUSCH) resources, and in some examples the contention-based PUSCH (CB-PUSCH) resources may include allocated bins, and a UE may select CB-PUSCH resources from one of the bins for transmission of the uplink data. A base station, in certain examples, may reallocate CB-PUSCH resources based on congestion of the uplink resources, for example.

A method of wireless communication is described. The method may include identifying data to be transmitted using a set of uplink resources and determining that the data is to be transmitted using a contention-based subset of the uplink resources or using a grant-based subset of the uplink resources. The method may also include transmitting the data using the contention-based subset of the uplink resources or the grant-based subset of the uplink resources.

An apparatus for wireless communication is described. The apparatus may include means for identifying data to be transmitted using a set of uplink resources and means for determining that the data is to be transmitted using a contention-based subset of the uplink resources or using a grant-based subset of the uplink resources. The apparatus may also include means for transmitting the data using the contention-based subset of the uplink resources or the grant-based subset of the uplink resources.

A further apparatus is described. The apparatus may include a processor, memory in electronic communication with the processor, and instructions stored in the memory. The instructions may be operable to cause the processor to identify data to be transmitted using a set of uplink resources and to determine that the data is to be transmitted using a contention-based subset of the uplink resources or using a grant-based subset of the uplink resources. The instructions may also cause the processor to transmit the data using the contention-based subset of the uplink resources or the grant-based subset of the uplink resources.

A non-transitory computer readable medium for wireless communication is described. The non-transitory computer-readable medium may include instructions executable to identify data to be transmitted using a set of uplink resources and to determine that the data is to be transmitted using a contention-based subset of the uplink resources or using a grant-based subset of the uplink resources. The instructions may also be executable to transmit the data using the contention-based subset of the uplink resources or the grant-based subset of the uplink resources.

Some examples of the method, apparatus, or non-transitory computer-readable medium described above may further include processes, features, means, or instructions for transmitting a scheduling request (SR) using an uplink control channel based on determining that the data is to be transmitted using the grant-based subset of the uplink resources. Some examples of the method, apparatus, or non-transitory computer-readable medium described above may further include processes, features, means, or instructions for receiving an uplink grant allocating the grant-based subset of the uplink resources to transmit the data.

Some examples of the method, apparatus, or non-transitory computer-readable medium described above may further include processes, features, means, or instructions for identifying one or more resources of the contention-based subset of the uplink resources based on determining that the data is to be transmitted using the contention-based subset of the uplink resources. Some examples of the method, apparatus, or non-transitory computer-readable medium described above may further include processes, features, means, or instructions for autonomously transmitting the data using the identified one or more resources of the contention-based subset of the uplink resources.

Some examples of the method, apparatus, or non-transitory computer-readable medium described above may further include processes, features, means, or instructions for determining a modulation and coding scheme (MCS) for transmitting the data based on the contention-based subset of the uplink resources. Other examples of the method, apparatus, or non-transitory computer-readable medium described above may further include processes, features, means, or instructions for determining a transmit power from a set of available transmit powers for transmitting the data based on the contention-based subset of the uplink resources.

In some examples of the method, apparatus, or non-transitory computer-readable medium described above, the determining that the data is to be transmitted using the contention-based subset of the uplink resources includes determining that an elapsed time since a scheduling request (SR) was transmitted exceeds a threshold. Some examples of the method, apparatus, or non-transitory computer-readable medium described above may further include processes, features, means, or instructions for determining to transmit the data using the contention-based subset of the uplink resources based on determining that the elapsed time exceeds the threshold.

Some examples of the method, apparatus, or non-transitory computer-readable medium described above may further include processes, features, means, or instructions for determining that the contention-based subset of the uplink resources supports a concurrent scheduling request (SR) associated with the data. Some examples of the method, apparatus, or non-transitory computer-readable medium described above may further include processes, features, means, or instructions for transmitting the SR concurrently with the data using the contention-based subset of the uplink resources.

In some examples of the method, apparatus, or non-transitory computer-readable medium described above, identifying the one or more resources of the contention-based subset of the uplink resources includes identifying one or more allocated bins for contention-based uplink transmissions. Some examples of the method, apparatus, or non-transitory computer-readable medium described above may further include processes, features, means, or instructions for selecting a bin of the one or more allocated bins for transmitting the data.

In some examples of the method, apparatus, or non-transitory computer-readable medium described above, selecting the bin of the one or more allocated bins includes randomly selecting the bin from a set of allocated bins. In other examples of the method, apparatus, or non-transitory computer-readable medium described above, selecting the bin of the one or more allocated bins includes identifying one or more characteristics of the data to be transmitted. Some examples of the method, apparatus, or non-transitory computer-readable medium described above may further include processes, features, means, or instructions for selecting the bin based on the one or more characteristics.

In some examples of the method, apparatus, or non-transitory computer-readable medium described above, the one or more characteristics comprise at least one of an amount of data to be transmitted, a type of traffic associated with the data to be transmitted, or a source of the data to be transmitted, or any combination thereof.

Some examples of the method, apparatus, or non-transitory computer-readable medium described above may further include processes, features, means, or instructions for receiving signaling indicating the one or more allocated bins, where the signaling comprises at least one of RRC signaling, a system information block (SIB), or physical downlink control channel (PDCCH) signaling, or any combination thereof.

Some examples of the method, apparatus, or non-transitory computer-readable medium described above may further include processes, features, means, or instructions for receiving a set of radio network temporary identifiers (RNTIs). Some examples of the method, apparatus, or non-transitory computer-readable medium described above may further include processes, features, means, or instructions for determining a RNTI from the set of RNTIs to be used for monitoring a physical downlink control channel (PDCCH). Some examples of the method, apparatus, or non-transitory computer-readable medium described above may further include processes, features, means, or instructions for monitoring the PDCCH for the determined RNTI. In some cases, the one or more resources of the contention-based subset of the uplink resources is identified based on the monitoring.

In some examples of the method, apparatus, or non-transitory computer-readable medium described above, the data comprises at least one of a data payload, an identification of a device transmitting the data, or a buffer status report indicating an amount of data that is to be transmitted, or any combination thereof. In some cases, the data comprises a buffer status report (BSR) that indicates an amount of data to be transmitted and an identifier of a device transmitting the BSR.

Some examples of the method, apparatus, or non-transitory computer-readable medium described above may further include processes, features, means, or instructions for determining that a negative acknowledgment message or that no acknowledgement message is received in response to transmitting the data using the contention-based subset of the uplink resources. Some examples of the method, apparatus, or non-transitory computer-readable medium described above may further include processes, features, means, or instructions for transmitting a scheduling request associated with the data based on determining that the negative acknowledgment message or that no acknowledgment message is received.

Some examples of the method, apparatus, or non-transitory computer-readable medium described above may further include processes, features, means, or instructions for determining that a buffer status report (BSR) is to be transmitted using the contention-based subset of the uplink resources. Some examples of the method, apparatus, or non-transitory computer-readable medium described above may further include processes, features, means, or instructions for autonomously transmitting the BSR using the contention-based subset of the uplink resources. In some cases, the BSR is transmitted using an identified BSR resource within the contention-based subset of the uplink resources. In some examples, the identified BSR resource comprises one code division multiplexing (CDM) code over one resource block of the contention-based subset of the uplink resources.

Some examples of the method, apparatus, or non-transitory computer-readable medium described above may further include processes, features, means, or instructions for receiving an uplink grant responsive to the BSR transmission based on an unsuccessful transmission of the data using the contention-based subset of the uplink resources. Some examples of the method, apparatus, or non-transitory computer-readable medium described above may further include processes, features, means, or instructions for receiving an uplink grant allocating one or more resources of the grant-based subset of the uplink resources responsive to the transmission of the BSR. In some examples of the method, apparatus, or non-transitory computer-readable medium described above, the BSR is transmitted when data to be transmitted exceeds a threshold amount of data for transmission using the contention-based subset of the uplink resources.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
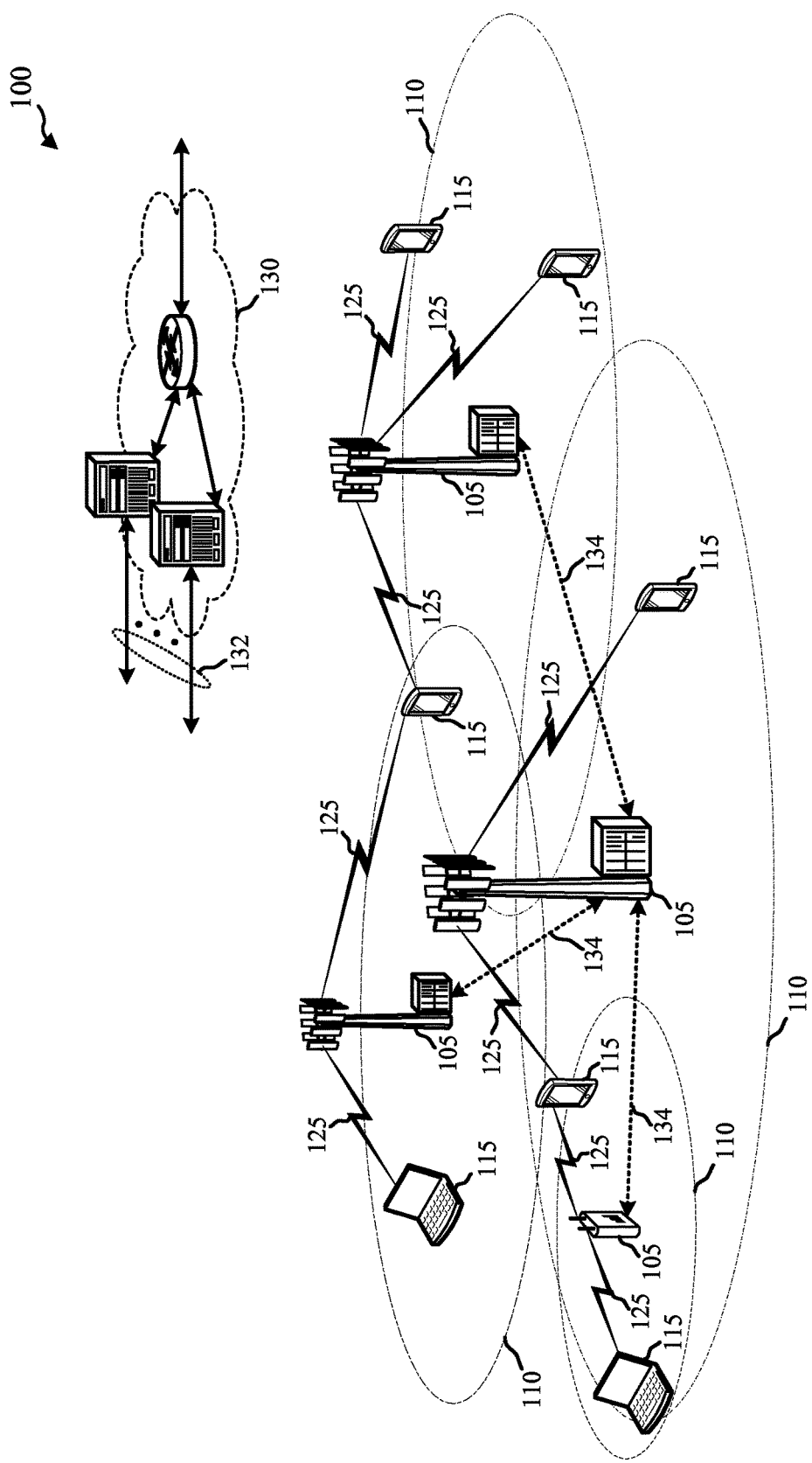
FIG. 1 shows a block diagram of a wireless communication system, in accordance with various aspects of the present disclosure.

Techniques are described for transmitting uplink communications within a wireless communications system. According to certain established wireless communications protocols, such as established Long Term Evolution (LTE) protocols, when a user equipment (UE) determines that a new data packet is to be transmitted, and no current uplink grant is available, a regular buffer status report (BSR) is triggered and a scheduling request (SR) is sent on the next available physical uplink control channel (PUCCH) occasion (or using a random access channel (RACH) access procedure if no PUCCH resource is configured). The base station then sends an uplink grant and the data is transmitted by the UE using the resource blocks (RBs) specified in the uplink grant. As mentioned above, such a procedure may introduce a delay that may be undesirable in certain situations. In some examples, the best case delay from the reception of the packet at the UE to the packet being decoded at the base station may be about 12 ms (or 12 transmission time intervals (TTIs)). Certain aspects of the present disclosure provide contention-based uplink transmission techniques that may provide a UE with an ability to transmit data to a base station autonomously, and thereby reduce delay in the transmission of the data.

A base station, in some examples, may allocate contention-based uplink resources from a set of available uplink resources. A UE may determine that data is to be transmitted using contention-based uplink resources, identify available contention-based resources allocated by the base station, and may autonomously transmit the data using the allocated contention-based resources. The contention-based uplink resources may include a subset of available physical uplink shared channel (PUSCH) resources, and in some examples the contention-based PUSCH (CB-PUSCH) resources may include allocated bins of CB-PUSCH resources. A UE may select CB-PUSCH resources from one of the bins for transmission of the uplink data. A base station, in certain examples, may reallocate CB-PUSCH resources based on congestion of the uplink resources, for example.

In some examples, a UE may determine that an amount of data to be transmitted may be transmitted using available CB-PUSCH resources. Such a determination may be made, for example, according to a type of data to be transmitted and/or an amount of data to be transmitted. CB-PUSCH resources may be identified, and the UE may autonomously transmit the data to the base station, thus reducing a delay associated with transmitting the data relative to using traditional scheduling requests to receive an allocation of uplink resources for transmission of the data. In some examples, a UE may determine that the data to be transmitted may not be transmitted using the CB-PUSCH resources, and the UE may initiate a scheduling request according to established scheduling request techniques. In further examples, a base station may allocate certain of the CB-PUSCH resources as buffer status report (BSR) resources that may be used to initiate a scheduling request from a UE to a base station. A UE, in such examples, may transmit a BSR using the BSR resources and receive an allocation of non-CB-PUSCH resources for transmitting the data responsive to the BSR transmission using the CB-PUSCH resources. In some examples, a UE may autonomously transmit data using CB-PUSCH resources and concurrently transmit a scheduling request. If a base station successfully receives the data on the CB-PUSCH resources, the concurrent SR may be disregarded, and the base station may allocate non-CB-PUSCH resources to the UE if the data on the CB-PUSCH resources is not successfully received.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, at least a portion of the wireless communications system 100 may be configured to operate using CB-PUSCH uplink transmissions, in which one or more of the UEs 115 and one or more of the base stations 105 may be configured to support uplink transmissions autonomously transmitted by UE(s) 115. A base station 105 may configure certain CB-PUSCH resources and transmit signaling (e.g., RRC signaling, signaling in a system information block (SIB), or PDCCH signaling) to the UEs 115 to indicate the allocated CB-PUSCH resources. A UE 115, upon determining that data may be transmitted using CB-PUSCH resources, may autonomously transmit the data using the CB-PUSCH resources, thereby transmitting the data with a reduced amount of delay relative to a delay associated with a scheduling request for transmission of the data.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
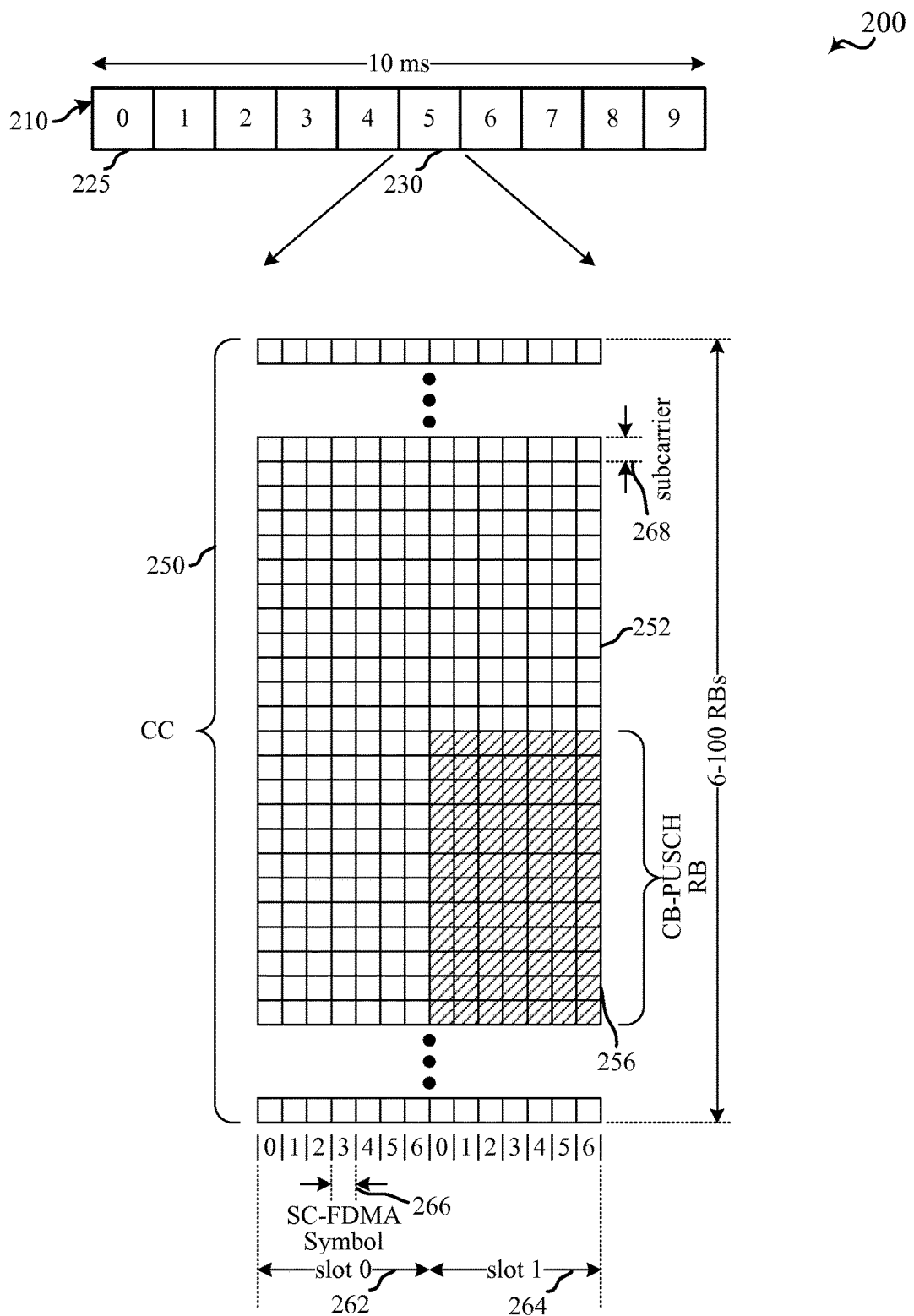
FIG. 2 is a diagram illustrating an example of an uplink frame structure that may be used in a wireless communication system, in accordance with an aspect of the present disclosure.

FIG. 2 is a diagram illustrating an example of an uplink frame structure 200 that may be used in a wireless communication system, including the wireless communication system 100 described above with reference to the FIG. 1. For example, the uplink frame structure 200 may be used in LTE/LTE-A or similar systems. A frame 210 (10 ms) may be divided into 10 equally sized subframes (e.g., subframe 225, 230, etc.). In some examples, frame 210 may be used for PUSCH transmissions by one more UEs (e.g., UEs 115 of FIG. 1) to a base station (e.g., base stations 105 of FIG. 1). Within frame 210, one or more subframes may be used for uplink transmissions. In examples that use LTE/LET-A or similar systems, each subframe may include two consecutive time slots 262 and 264. A single carrier frequency division multiple access (SC-FDMA) component carrier 250 may be illustrated as a resource grid representing the two consecutive time slots 262, 264, each time slot including seven SC-FDMA symbols 266, for a normal cyclic prefix. The resource grid may be divided into multiple resource elements 252. In some examples, certain resources within one or more subframes may be allocated for CB-PUSCH transmissions such as, for example, a number of resource blocks (RBs) which may include CB-PUSCH RB 256. CB-PUSCH RB 256 may be a LTE/LTE-A RB that may contain 12 consecutive subcarriers 268 in the frequency domain and, for a normal cyclic prefix in each SC-FDMA symbol 266, 7 consecutive SC-FDMA symbols 266 in the time domain, or 84 resource elements 252. The tone spacing for subcarriers 268 may be 15 kHz, and a useful symbol duration for SC-FDMA symbols 266 may be 66.67 μs.

Figure 3:
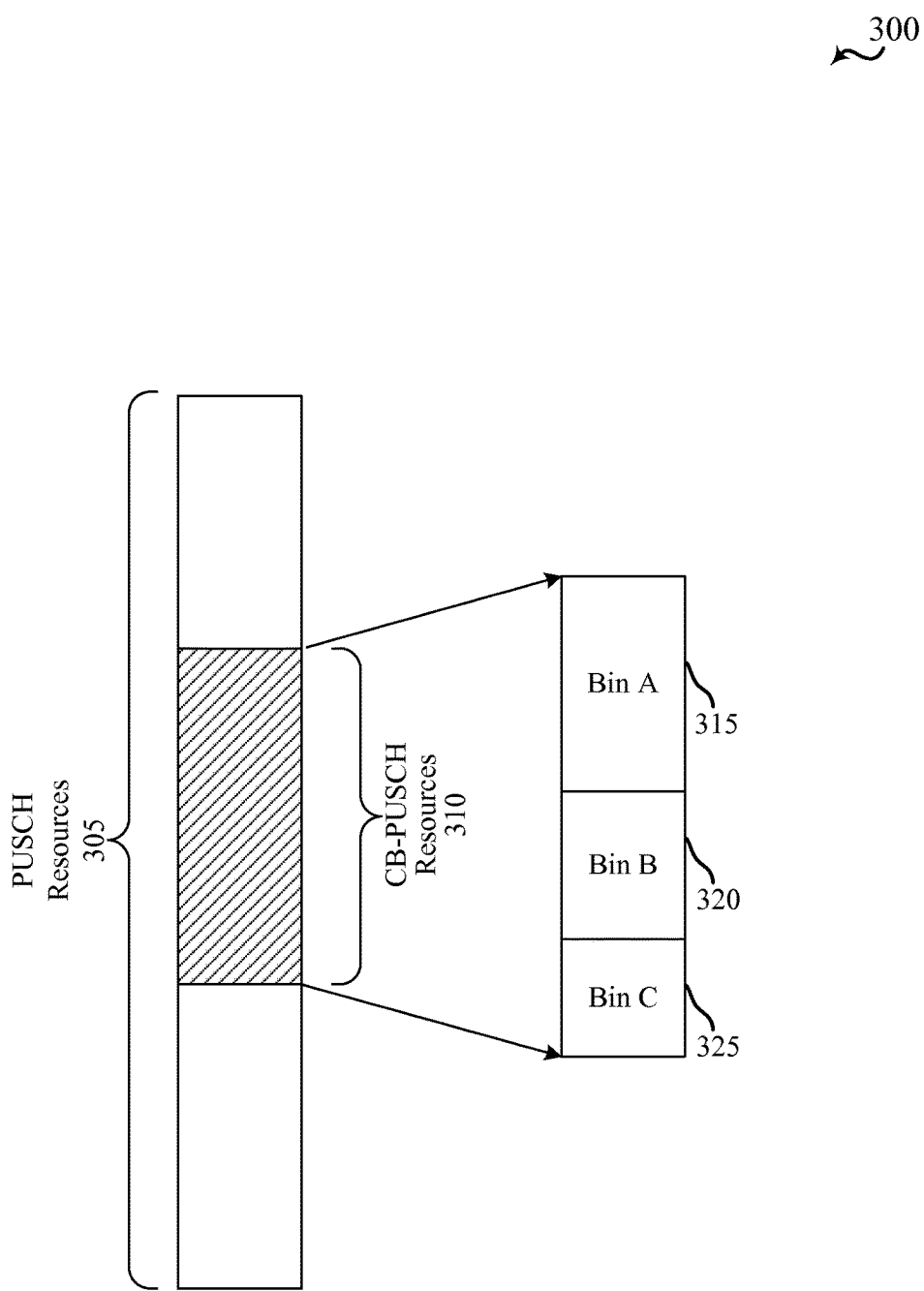
FIG. 3 is a block diagram conceptually illustrating an example of uplink resources of a wireless communication system, in accordance with an aspect of the present disclosure.

As discussed above, various examples provide uplink communications in a wireless communications system, such as wireless communications system 100 of FIG. 1, using contention-based resources, such as CB-PUSCH RB 256. FIG. 3 is a block diagram 300 conceptually illustrating an example PUSCH resources 305 and allocated CB-PUSCH resources 310 within the PUSCH resources 305 that may be used for uplink transmissions in a wireless communication system, in accordance with an aspect of the present disclosure. In some examples, a base station, such as a base station 105 of FIG. 1, may allocate CB-PUSCH resources 310 for use in contention-based transmissions, and may transmit signaling to a user equipment (UE) indicating the CB-PUSCH resources 310. The PUSCH resources 305 may include uplink resources such as described in FIG. 2, for example, and CB-PUSCH resources 310 may include a number of CB-PUSCH RBs 256 such as described in FIG. 2.

According to some aspects of the disclosure, in order to reduce the likelihood of collisions amongst multiple UEs that may contend for use of the CB-PUSCH resources 310, a base station may allocate a number of bins 315, 320, and 325 within the CB-PUSCH resources 310 for use by the one or more UEs. Each of the allocated bins may include, for example, a number of contiguous resource blocks (e.g., CB-PUSCH RBs 256 of FIG. 2), that are allocated for CB-PUSCH transmissions. A UE operating in a system having such CB-PUSCH resources 310 allocated for uplink transmissions, may identify uplink data to be transmitted, may determine that the data is to be transmitted using the CB-PUSCH resources 310, identify a bin 315, 320, 325 within the CB-PUSCH resources 310 for transmitting the data, and autonomously transmit the data using an identified bin 315-325 of the CB-PUSCH resources 310. In certain examples, the UE may make a determination of whether to transmit the uplink data using the CB-PUSCH resources 310, or to transmit the data according to legacy procedures through transmitting a scheduling request and receiving an uplink grant of uplink resources to use in transmitting the data.

In some examples, the CB-PUSCH resources 310, and bins 315, 320, 325, may be allocated and reallocated on a semi-persistent, or semi-static, basis. In other examples, the CB-PUSCH resources 310, and bins 315, 320, 325 may be dynamically allocated by a base station, based on a number of factors, such as the number of UEs that are likely to transmit using the CB-PUSCH resources 310, a type of data being transmitted by the UEs, loading of the system, and/or congestion of the CB-PUSCH resources 310, to name but a few examples. In some examples, a base station may transmit signaling to UEs indicating the resource allocation, such as through one or more of RRC signaling, a system information block (SIB), or physical downlink control channel (PDCCH) signaling.

While three bins 315-325 are illustrated in FIG. 3, different numbers of bins may be allocated within CB-PUSCH resources 310, and such allocation may be adjusted by a base station to accommodate system conditions. For example, if B bins are available, and a UE picks one at random, the probability of a collision in transmissions from two or more UEs will depend upon the number B, the number of UEs, and the frequency at which each UE will transmit data using the CB-PUSCH resources 310. If a base station detects that CB-PUSCH resources 310 are becoming congested, based on determining that there are a number of collisions, the base station may adjust the number of bins and/or may signal one or more UEs to reduce a number of CB-PUSCH transmission attempts. In some examples, a base station may determine that one or more bins are becoming, or are likely to become, congested based on one or more metrics that may include, for example, one or more of a number of UEs configured to use each bin, energy measurements for each bin that may indicate colliding users, or a time average of successful decodes in a bin versus a number of transmissions in the bin.

If the base station determines that one or more bins are experiencing congestion, the base station, in certain examples, may transmit further signaling to UEs, indicating a backoff parameter is to be applied to one or more bins. The backoff parameter may, for example, instruct a UE to reduce its CB-PUSCH transmissions on a bin by a fraction 'a' (0<a<1). In the UE determines that a CB-PUSCH transmission is to be attempted on the identified bin, then there will be a probability 'a' that the UE will elect to use another CB-PUSCH bin or use a traditional SR transmission. In any event, such a backoff parameter will work to reduce the congestion experienced by the identified bin. In other examples, the base station may increasing CB-PUSCH resources based on a determination that one or more bins are experiencing congestion. For example, if a CB-PUSCH bin, such as one of bins 315-325, is congested, and PUSCH RBs are under-utilized, the base station may configure one or more additional CB-PUSCH bins.

The data transmitted using the CB-PUSCH resources 310 may include, according to various examples, the data to be transmitted by the UE, a cell radio network temporary identifier (C-RNTI), and a buffer status report (BSR). If the base station successfully receives the CB-PUSCH transmission on the CB-PUSCH resources 310, the base station may transmit an acknowledgment of the receipt. Such an acknowledgment may be transmitted, for example, according to established acknowledgment techniques, such as an acknowledgment transmitted to a UE over the PDCCH in subframe n+4. In examples where a UE transmits a BSR with the data that indicates additional data is ready to be transmitted, the base station may also transmit an uplink grant to the UE for transmission of the additional data. In some examples, a UE may determine whether an acknowledgment of the data is received and, in the absence of receiving an acknowledgment of receipt, may transmit a SR to the base station. In such a manner, a total delay associated with transmitting the data may be reduced in the event that heavy congestion may result in successive transmissions not being successfully received by the base station. In other examples, a UE may transmit a concurrent SR, using PUCCH resources in addition to transmitting using the CB-PUSCH resources 310. A base station, in some examples, may allocate PUCCH resources to a UE for such transmissions in order to allow for concurrent SR and CB-PUSCH transmissions, or the UE may transmit such a SR using the next available PUCCH resources following a CB-PUSCH transmission. A base station may then determine that a CB-PUSCH transmission has been received from a UE, and may then ignore the SR from the UE when an elapsed time between the CB-PUSCH transmission and the SR is less than a threshold.

A UE, when selecting of a bin from CB-PUSCH resources 310, such as from bins 315, 320, or 325, for transmitting data may perform selection according to one or more of a number of techniques. For example, a UE may randomly select a bin from the number of available bins 315, 320, 325, and/or may select the bin based on characteristics of the data to be transmitted. In some examples, a UE may determine characteristic of the data to be transmitted, such as an amount of data and a type of traffic associated with the data. In certain examples, the UE may determine, based on the amount of data and/or type of traffic, whether to use the CB-PUSCH resources 310 or traditional SR-based resources. For example, if the data is not delay sensitive, the UE may determine to use a traditional SR to receive an uplink allocation for transmission of the data, rather than transmitting the data using the CB-PUSCH resources 310. In some examples, the UE may receive signaling from a base station indicating that certain type of traffic are to be transmitted in one or more of the bins 315-325. In other examples, the bins 315-325 may have different amounts of uplink resources available, and a UE may select a bin based on the resources available in the bin and the amount of data to be transmitted. In some cases, if two or more bins satisfy the criteria, the UE may randomly select from the bins, for example. In other examples, a UE may receive signaling from the base station that indicates a bin 315-325 to be used for CB-PUSCH transmissions.

In some examples, a demodulation reference signal (DMRS) sequence for transmitting data using the CB-PUSCH resources 310 may be determined based on the selected bin 315-325. Additionally, in some examples, a UE may determine a modulation and coding scheme (MCS) and/or a transmit power for transmitting the data based on the allocated CB-PUSCH resources 310 to be used to transmit the data. The uplink transmit power may be determined according to established LTE uplink transmit power determination techniques, or may be determined according to a modified uplink transmit power determination that may use a higher transmit power to compensate for lack of hybrid automatic repeat request (HARD) associated with the CB-PUSCH transmission. In certain examples, the base station may fix CB-PUSCH bin sizes to ensure that transport block size (TBS) for UE transmissions may fit within the resources allocated for the bin(s). In some examples, a base station may also set bin size based on non-CB-PUSCH traffic considerations. A UE, according to various examples, may find TBS for CB-PUSCH transmissions according to established techniques of the LTE standards.

In some examples, a base station may configure a set of transmit power values, that a UE may select at random. A base station, receiving CB-PUSCH transmissions from multiple UEs using the same CB-PUSCH resources may in some cases be able to use interference cancellation techniques to successfully decode each CB-PUSCH transmission based on different transmit powers used by the UEs. In some examples, as discussed above, a base station may also configure different MCSs for different UEs. Thus, if multiple UEs transmit using a same CB-PUSCH bin, the base station may use the different MCSs to further assist in interference cancellation in order to decode each received transmission. In such examples, the base station may signal each UE to transmit a demodulation reference signal (DMRS) that do not collide. In some examples, a UE may make a determination of the MC based on, for example, uplink channel quality indicator (CQI) feedback. In certain examples, in order to further enhance interference cancellation, a base station may use beamforming techniques using multiple receive antennas at the base station to decode concurrent transmissions from multiple UEs. In such examples, a UE may transmit using a single transmit antenna (i.e., rank 1), and the base station may use multiple receive antennas to decode transmissions from multiple UEs.

In certain examples, a UE may determine that non-contention-based resources are to be used for uplink data transmission, and the UE may transmit a SR in order to receive an uplink grant in order to transmit the data. In order to allow for efficient management of CB-PUSCH resources 310, a UE may be prohibited from transmitting data using the CB-PUSCH resources 310 for a predetermined time period following the transmission of a SR. In such examples, a UE may determine an elapsed time since a SR was transmitted, and determine that data may be transmitted using the CB-PUSCH resources 310 if the elapsed time exceeds a threshold.

As mentioned above, in some examples dynamic reconfiguration of CB-PUSCH resources 310 may be performed. In some examples, CB-PUSCH data bins 315-325 may be transmitted, along with an MCS for a subframe n over PDCCH in subframe n−[4]. In such examples, a UE may monitor the PDCCH and at the start of subframe n knows the CB-PUSCH resources 310 for subframes n+1, . . . , n+3. When data packet arrives that is to be transmitted using CB-PUSCH resources 310, the UE can transmit the data in the next feasible subframe. In other examples, then RRC signaling and/or a SIB transmission may be used to announce a set of RNTIs to be used for CB-PUSCH, and a UE may pick one at random from the set for each subframe, and monitor the PDCCH for the chosen RNTI for an UL grant.

Figure 4:
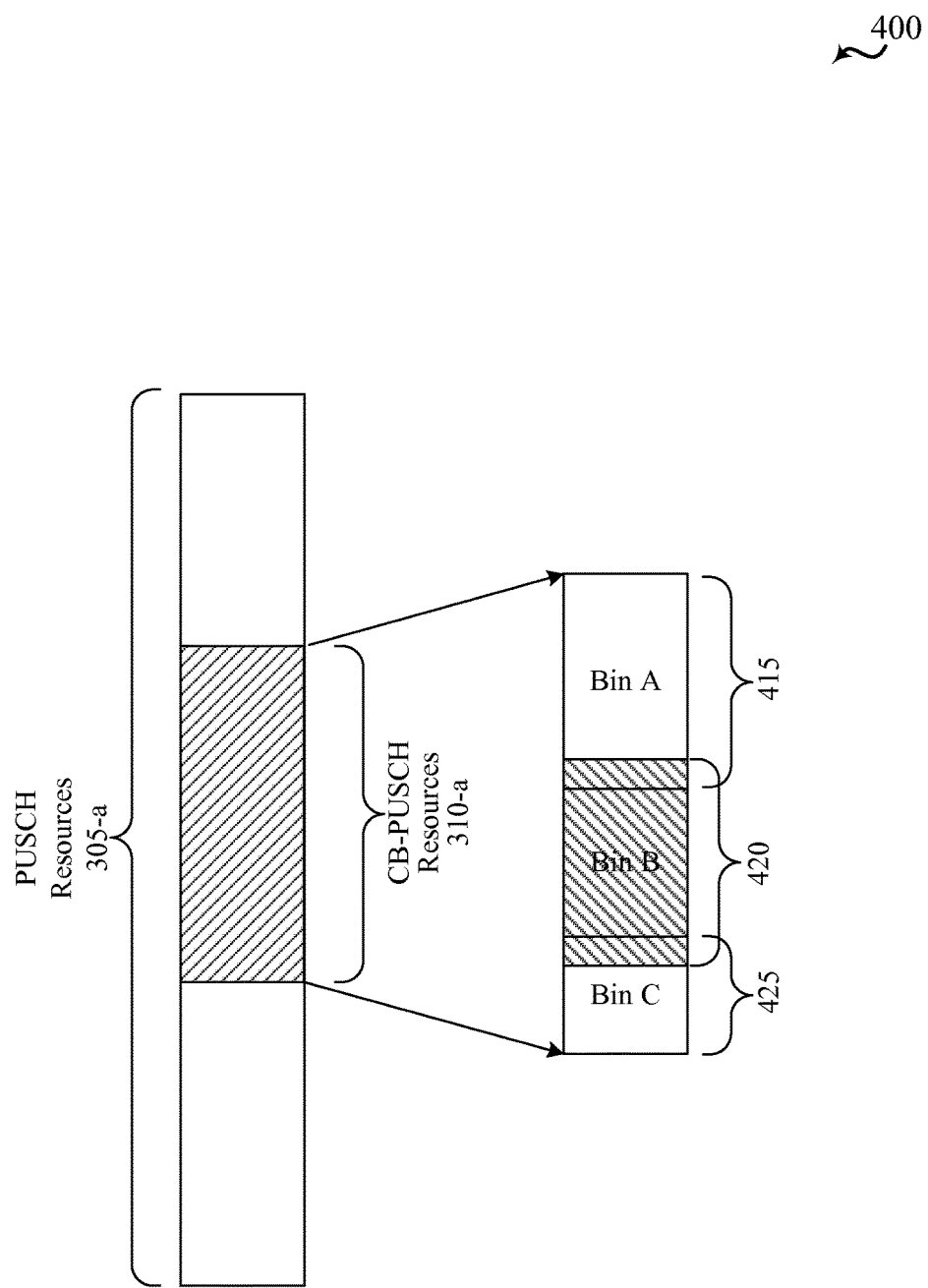
FIG. 4 is a block diagram conceptually illustrating another example of uplink resources of a wireless communication system, in accordance with an aspect of the present disclosure.

While the example of FIG. 3 shows a number of CB-PUSCH bins 315-325 that occupy unique sets of CB-PUSCH resources 310, in other examples a number of CB-PUSCH bins may have overlapping or nested CB-PUSCH resources. FIG. 4 is a block diagram 400 conceptually illustrating an example PUSCH resources 305-*a* and allocated CB-PUSCH resources 310-*a* within the PUSCH resources 305-*a* that may be used for uplink transmissions in a wireless communication system, in accordance with an aspect of the present disclosure. In some examples, a base station, such as a base station 105 of FIG. 1, may allocate CB-PUSCH resources 310-*a* for use in contention-based transmissions, and may transmit signaling to a user equipment (UE) indicating the CB-PUSCH resources 310-*a*. The PUSCH resources 305-*a* may include uplink resources such as described in FIG. 2, for example, and CB-PUSCH resources 310-*a* may include a number of CB-PUSCH RBs 256 such as described in FIG. 2. In this example, three bins 415-425 are allocated, namely bin A 415, bin B 420, and bin C 425. In this example, bin B 420 has some resource blocks that overlap with resource blocks of bin A 415. Similarly, bin B 420 has some resource blocks that overlap with resource blocks of bin C 425. A UE, when determining which bin 415-425 to use for a CB-PUSCH transmission, may select a bin based on the amount of data to be transmitted. Thus, resources may be efficiently used for CB-PUSCH transmissions through a UE selecting a bin that has an amount of resources that is appropriate for the amount of data to be transmitted using the CB-PUSCH resources 310-*a*.

Figure 5:
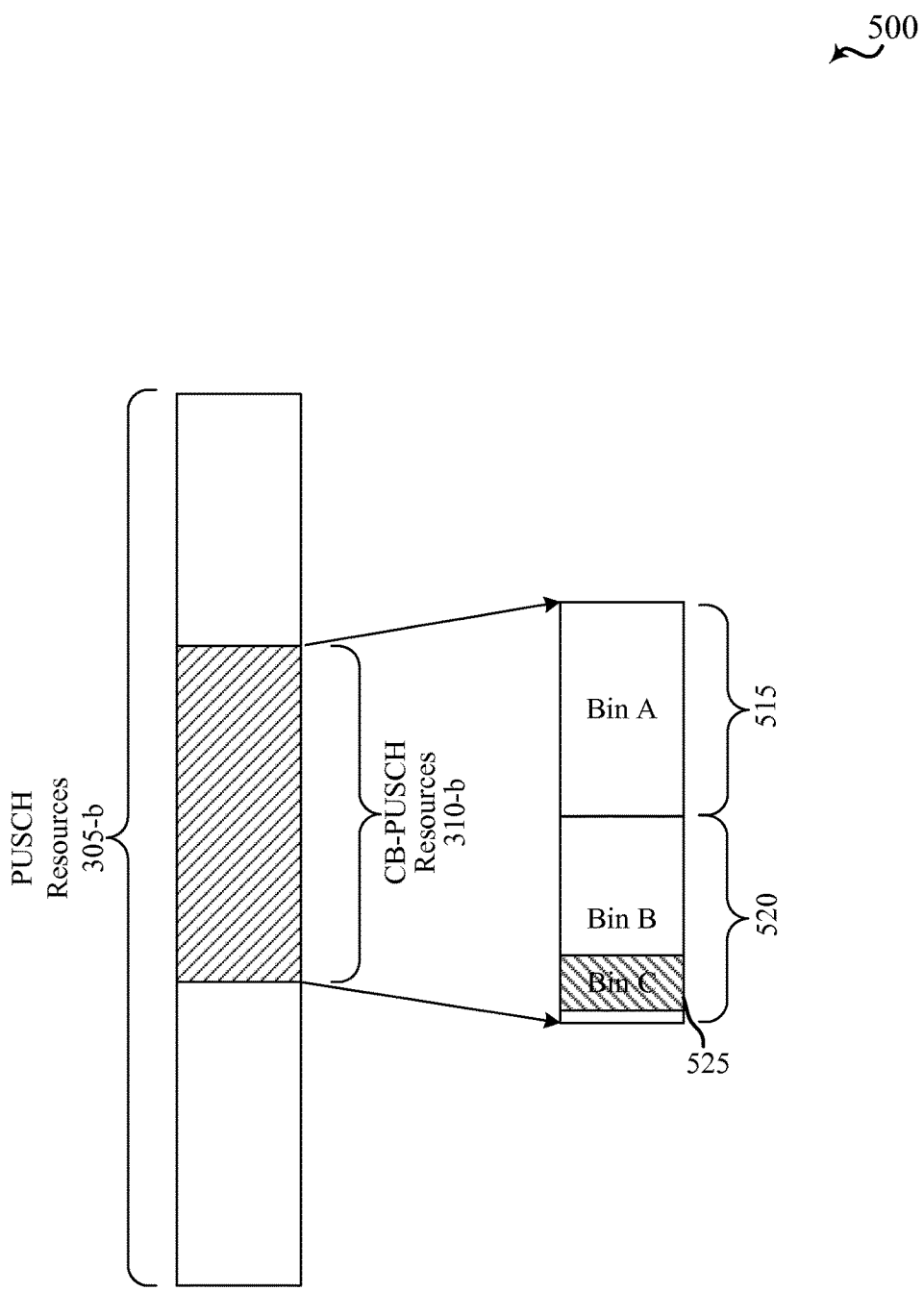
FIG. 5 is a block diagram conceptually illustrating another example of uplink resources of a wireless communication system, in accordance with an aspect of the present disclosure.

Similarly, a base station may allocate nested resources for one or more bins within CB-PUSCH resources. FIG. 5 is a block diagram 500 conceptually illustrating an example PUSCH resources 305-*b* and allocated CB-PUSCH resources 310-*b* within the PUSCH resources 305-*b* that may be used for uplink transmissions in a wireless communication system, in accordance with an aspect of the present disclosure. In some examples, a base station, such as a base station 105 of FIG. 1, may allocate CB-PUSCH resources 310-*b* for use in contention-based transmissions, and may transmit signaling to a user equipment (UE) indicating the CB-PUSCH resources 310-*b*. The PUSCH resources 305-*b* may include uplink resources such as described in FIG. 2, for example, and CB-PUSCH resources 310-*b* may include a number of CB-PUSCH RBs 256 such as described in FIG. 2. In this example, three bins 515-525 are allocated, namely bin A 515, bin B 520, and bin C 525. In this example, bin C 525 is nested within bin B 520. A UE, when determining which bin 515-525 to use for a CB-PUSCH transmission, may select a bin based on the amount of data to be transmitted. Thus, resources may be efficiently used for CB-PUSCH transmissions through a UE selecting a bin that has an amount of resources that is appropriate for the amount of data to be transmitted using the CB-PUSCH resources 310-*b*.

Figure 6:
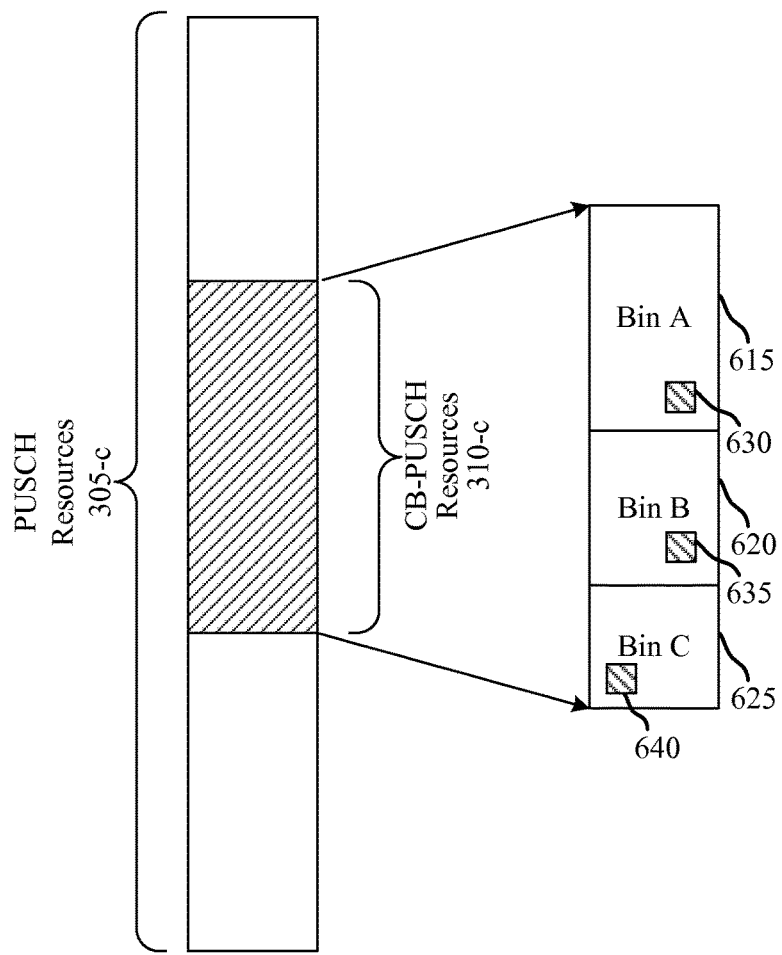
FIG. 6 is a block diagram conceptually illustrating another example of uplink resources of a wireless communication system, in accordance with an aspect of the present disclosure.

In additional to transmitting data using CB-PUSCH resources, certain aspects of the disclosure may provide that a BSR may be transmitted using CB-PUSCH resources. FIG. 6 is a block diagram 600 conceptually illustrating an example PUSCH resources 305-*c* and allocated CB-PUSCH resources 310-*c* within the PUSCH resources 305-*c* that may be used for uplink transmissions in a wireless communication system, in accordance with an aspect of the present disclosure. In some examples, a base station, such as a base station 105 of FIG. 1, may allocate CB-PUSCH resources 310-*c* for use in contention-based transmissions, and may transmit signaling to a user equipment (UE) indicating the CB-PUSCH resources 310-*c*. The PUSCH resources 305-*c* may include uplink resources such as described in FIG. 2, for example, and CB-PUSCH resources 310-*c* may include a number of CB-PUSCH RBs 256 such as described in FIG. 2. In this example, three bins 615-525 are allocated, namely bin A 615, bin B 620, and bin C 625.

Further, in this example, the base station may configure a number of BSR resources 630-640 that may be used by a UE to transmit a BSR within the CB-PUSCH resources 310-*c*. The BSR resources 630-640 may include, for example, one code division multiplexing (CDM) code over one RB within a bin 615-625. A UE may use these BSR resources to transmit a BSR in order to receive an uplink grant from the base station. In some examples, the UE may transmit a BSR plus C-RNTI (24 bits), along with a CRC (24 bits). There may be a number of orthogonal codes per RB, and one may be selected at random by a UE, to further enhance the likelihood that the BSR will be successfully received at the base station. If the BSR is successfully received in subframe n, then the base station may transmit an uplink grant in subframe n+4. According to certain examples, the base station may configure the bin type for each bin 615-625 to be a data bin or a bin that includes BSR resources, and this information may be signaled to UEs using, for example, a RRC message.

In some examples, a base station may always configure a CB-PUSCH BSR RB 630-640 with every CB-PUSCH data bin 615-625. A UE may pick a data bin 615-625, and then a BSR bin from within in the corresponding BSR RB 630-640. The CB BSR transmission will thus be more reliable than a CB-PUSCH data transmission, because there is competition only amongst UEs choosing same data bin. Furthermore, such BSR transmissions may also enable a base station to perform collision resolution and hence HARQ procedures. HARQ operations may rely on C-RNTI along with a bin 615-625 used for CB-PUSCH transmission by a UE. A base station may resolve contention and use HARQ if the BSR and C-RNTI are decoded.

Figure 7:
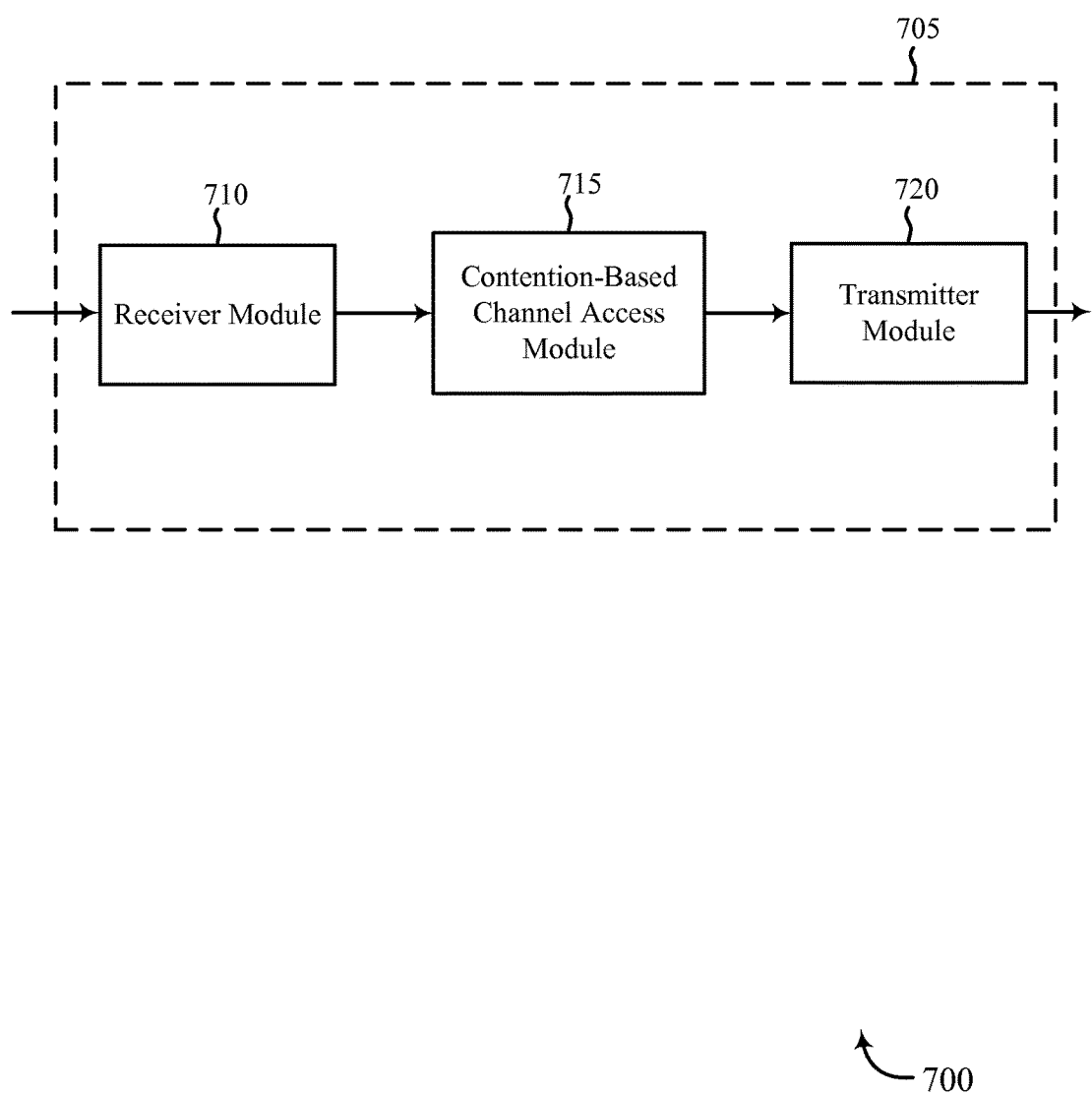
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1. The device 705 may include a receiver module 710, a contention-based channel access module 715, and/or a transmitter module 720. The device 705 may also be or include a processor (not shown). Each of these modules may be in communication with each other. Device 705 may also represent an example of a UE 115-a or a base station 105-a as described reference to FIGS. 9 and 12.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.). The receiver module 710 may be configured to receive signaling indicating CB-PUSCH resources for transmitting uplink data, for example. Information may be passed on to the contention-based channel access module 715, and to other components of the device 705. Receiver module 710 may also represent examples of aspects of a transceiver module 935 or a base station transceiver module 1250 as described with reference to FIGS. 9 and 12.

The contention-based channel access module 715 may be configured to identify data to be transmitted using a set of uplink resources and may determine that the data is to be transmitted using a contention-based subset of the uplink resources or using a grant-based subset of the uplink resources, such as discussed above with respect to FIGS. 2-6. The contention-based channel access module 715 may be an aspect of a processor, such as the processor 905 as described with reference to FIG. 9.

The transmitter module 720 may transmit the one or more signals received from other components of the device 705. The transmitter module 720 may transmit the data using the contention-based subset of the uplink resources or the grant-based subset of the uplink resources, for example. In some examples, the transmitter module 720 may be collocated with the receiver module 710 in a transceiver module. The transmitter module 720 may also represent examples of aspects of a transceiver module 935 or a base station transceiver module 1250 as described with reference to FIGS. 9 and 12.

Figure 8:
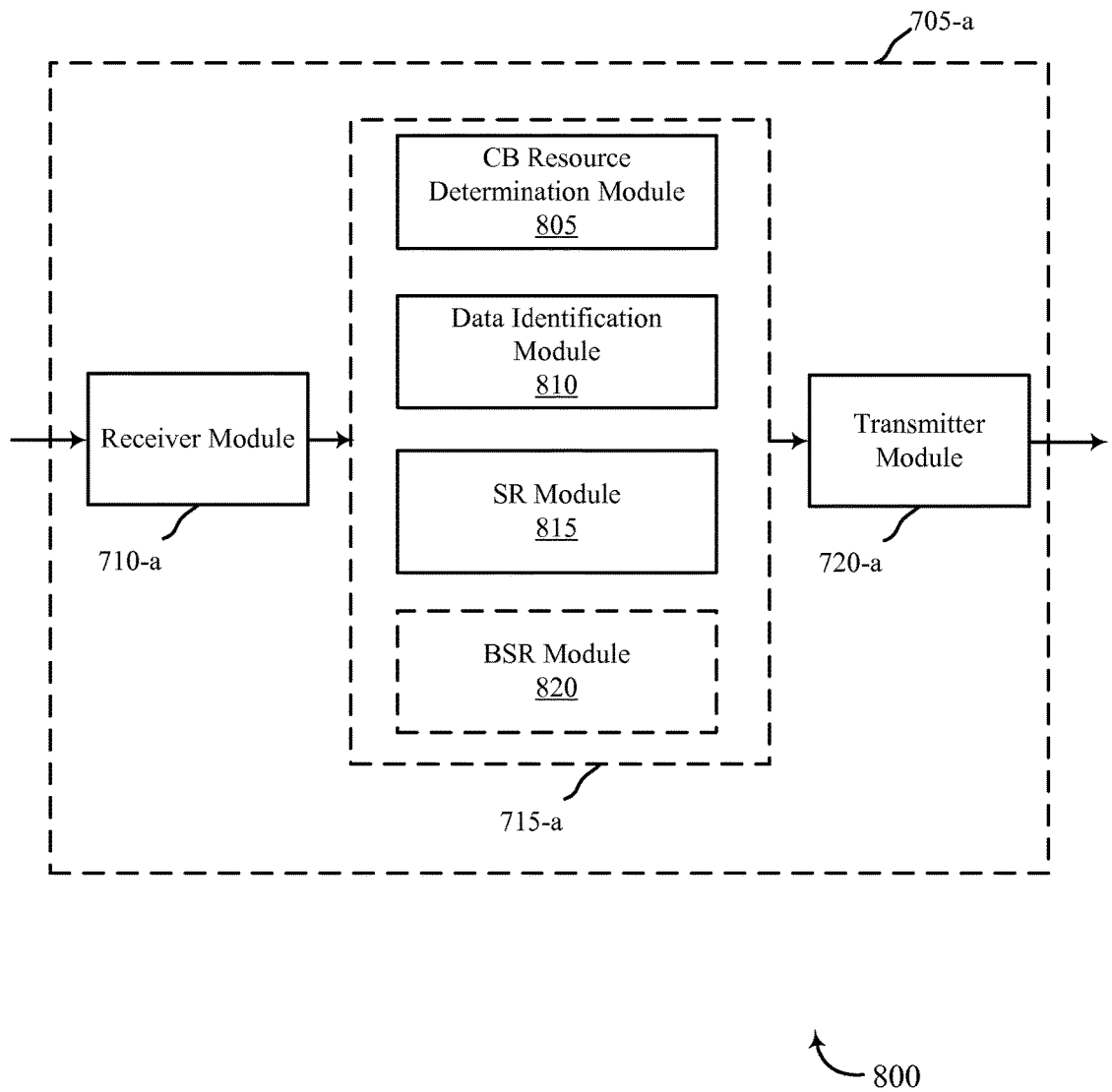
FIG. 8 shows a block diagram of a device configured for use in wireless communication, in accordance with various aspects of the present disclosure.

FIG. 8 shows a block diagram 800 of a device 705-a for use in wireless communication, in accordance with various examples. The device 705-a may be an example of one or more aspects of a UE 115 described with reference to FIG. 1. It may also be an example of a device 705 described with reference to FIG. 7. The device 705-a may include a receiver module 710-a, a contention-based channel access module 715-a, and/or a transmitter module 720-a, which may be examples of the corresponding modules of device 705. The device 705-a may also include a processor (not shown). Each of these components may be in communication with each other. The contention-based channel access module 715-a may include a contention-based resource determination module 805, a data identification module 810, a scheduling request module 815, and optional BSR module 820. The receiver module 710-a and the transmitter module 720-a may perform the functions of the receiver module 710 and the transmitter module 720, of FIG. 7, respectively. Each of the components of device 705-a may illustrate aspects of a processor, for example, processor 905 as described with reference to FIG. 9.

The contention-based resource determination module 805 may identify data that is to be transmitted using a contention-based subset of uplink resources or using a grant-based subset of the uplink resources, such as discussed above with respect to FIGS. 2-6. In some cases, the contention-based resource determination module 805 may identify one or more resources of the contention-based subset of the uplink resources based on determining that the data is to be transmitted using the contention-based subset of the uplink resources and may autonomously transmit the data using the identified resources of the contention-based subset of the uplink resources. In some examples, one or more allocated bins for contention-based uplink transmissions may be identified and selected for transmitting the data. Contention-based resource determination module 805 may randomly select the bins from a plurality of allocated bins, or it may identify one or more characteristics of the data to be transmitted and select the bin based on the characteristics, where the characteristics may include an amount of data to be transmitted, a type of traffic associated with the data to be transmitted, or a source of the data to be transmitted, or any combination thereof. In some cases, contention-based resource determination module 805 may receive signaling indicating the one or more allocated bins, where the signaling may be RRC signaling, a SIB, a PDCCH, or any combination thereof.

Additionally, the contention-based resource determination module 805 may determine a modulation and coding scheme for transmitting the data based on the contention-based subset of the uplink resources and it may determine a transmit power from a set of available transmit powers for transmitting the data based on the contention-based subset of the uplink resources. In other examples, the contention-based resource determination module 805 may determine that the data is to be transmitted using the contention-based resources by determining that an elapsed time since a SR request was transmitted exceeds a threshold. The contention-based resource determination module 805 may also receive a set of radio network temporary identifiers (RNTIs), determine a RNTI from the set of RNTIs to be used for monitoring a PDCCH, and monitor the PDCCH for the determined RNTI, where the one or more resources of the contention-based subset of the uplink resources is identified based on the monitoring.

The data identification module 810 may identify data that is to be transmitted using a set of uplink resources, in a manner similar as discussed above with respect to FIGS. 2-6. In some cases, the data may include a data payload, an identification of the device transmitting the data, or a buffer status report indicating an amount of data that is to be transmitted, or any combination thereof.

The scheduling request (SR) module 815 may transmit a scheduling request using an uplink control channel based on determining that the data is to be transmitted using the grant-based subset of the uplink resources and may receive an uplink grant allocating the grant-based subset of the uplink resources to transmit the data, in a manner similar as discussed above with respect to FIGS. 2-6. In some examples, the SR module 815 may determine that the contention-based subset of the uplink resources supports a concurrent SR associated with the data and transmits the SR concurrently with the data using the contention-based subset of the uplink resources. In other cases, the SR module 815 may determine that a NACK message or that no ACK/NACK message is received in response to transmitting the data using the contention-based subset of the uplink resources and may transmit a SR associated with the data based at least in part on determining that the NACK message or that no ACK/NACK message is received.

BSR module 820 may determine a BSR and transmit the BSR using dedicated BSR resources, such as discussed above with respect to FIG. 6. The BSR may indicate an amount of data to be transmitted and an identifier of the device transmitting the BSR. In some cases, the BSR module 820 may determine that a BSR is to be transmitted using the contention-based subset of the uplink resources and may autonomously transmit the BSR using the contention-based subset of the uplink resources, which may use an identified BSR resource within the contention-based subset of the uplink resources, as discussed with respect to FIG. 3. In some cases, the identified BSR resource may include CDM code over one resource block of the contention-based subset of the uplink resources. The BSR may be transmitted when the data to be transmitted exceeds a threshold amount of data for transmission using the contention-based subset of the uplink resources. In other examples, the BSR module 820 may receive an uplink grant responsive to the BSR transmission based on an unsuccessful transmission of the data using the contention-based subset of the uplink resources. In other cases, BSR module 820 may receive an uplink grant allocating one or more resources of the grant-based subset of the uplink resources responsive to the transmission of the BSR.

Figure 9:
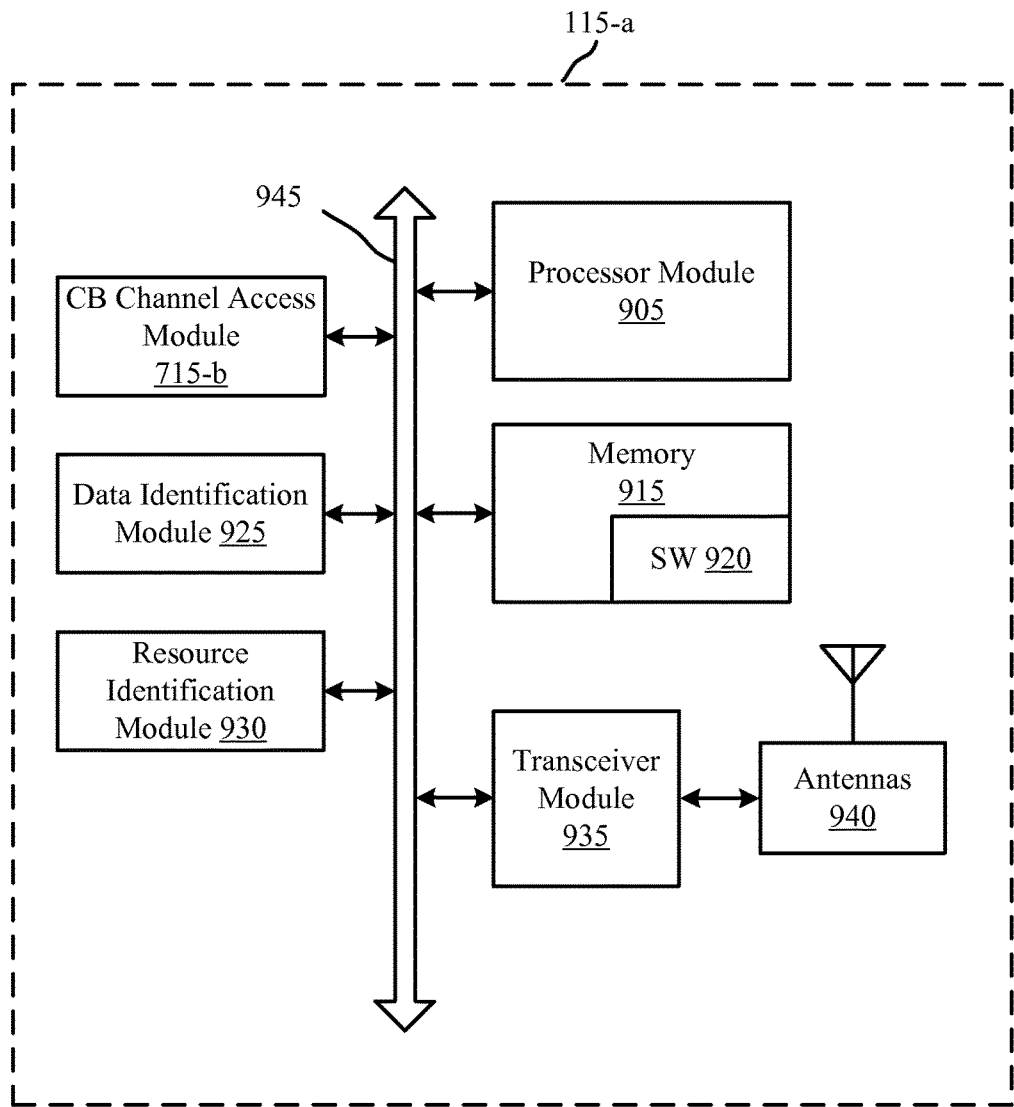
FIG. 9 shows a block diagram of a wireless communication system, in accordance with various aspects of the present disclosure.

FIG. 9 shows a system 900 for use in wireless communication, in accordance with various examples. System 900 may include a UE 115-a, which may be an example of the UEs 115 of FIG. 1. UE 115-a may also be an example of one or more aspects of device 705 of FIGS. 7 and 8.

The UE 115-a may generally include components for bi-directional voice and data communications including components for transmitting communications and components for receiving communications. The UE 115-a may include antenna(s) 940, a transceiver module 935, a processor 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105 with reference to FIG. 1. The transceiver module 935 may include a modem configured to modulate the packets and provide the modulated packets to the antenna(s) 940 for transmission, and to demodulate packets received from the antenna(s) 940. While the UE 115-a may include a single antenna 940, the UE 115-a may have multiple antennas 940 capable of concurrently transmitting and/or receiving multiple wireless transmissions. The transceiver module 935 may be capable of concurrently communicating with one or more base stations 105 via multiple component carriers.

The UE 115-a may include a contention-based channel access module 715-b, which may perform the functions described above for the contention-based channel access module 715 of device 705 of FIGS. 7 and 8. The UE 115-a may also include data identification module 925 that may determine data that is to be transmitted using CB-PUSCH resources, in a manner similar as discussed above with respect to FIGS. 2-6. The UE 115-a may also include resource identification module 930 that may identify resources for use in CB-PUSCH transmissions, in a manner similar as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor 905 to perform various functions described herein (e.g., CB-PUSCH transmissions and related determinations, etc.). Alternatively, the computer-readable, computer-executable software/firmware code 920 may not be directly executable by the processor 905 but be configured to cause a computer (e.g., when compiled and executed) to perform functions described herein. The processor 905 may include an intelligent hardware device, e.g., a central processing unit (CPU), a microcontroller, an application-specific integrated circuit (ASIC), etc.

Figure 10:
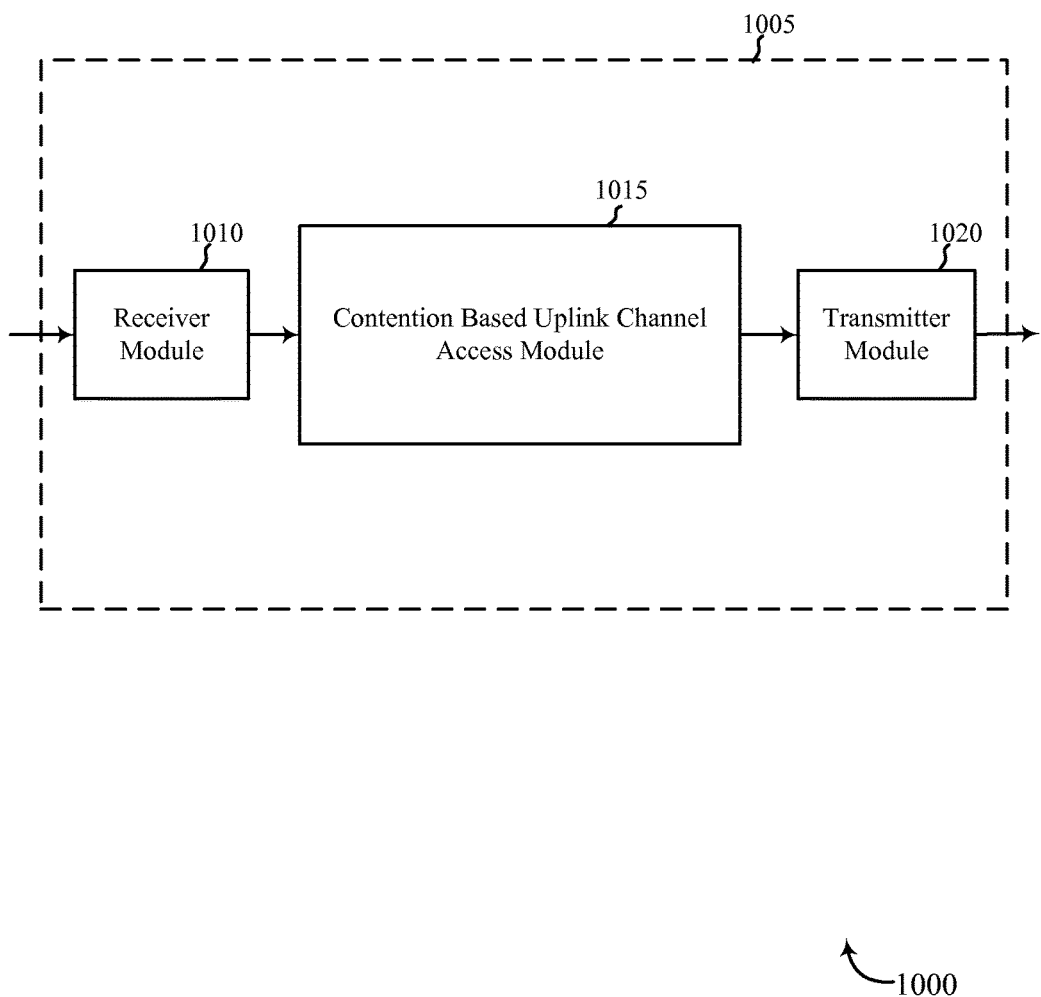
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station. The apparatus 1005 may also be a processor. The apparatus 1005 may include a receiver module 1010, a contention-based uplink channel access module 1015, and/or a transmitter module 1020. Each of these modules may be in communication with each other. Apparatus 1005 may also represent an example of a UE 115-a or a base station 105-a as described with reference to FIGS. 9 and 12.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010 may include at least one radio frequency (RF) receiver, such as an RF receiver operable to receive CB-PUSCH transmissions. The receiver module 1010 may be used to receive various types of data and/or control signals (i.e., transmissions) over one or more communication links of a wireless communication system, such as one or more communication links of the wireless communications system 100 described with reference to FIG. 1. Receiver module 1010 may also represent examples of aspects of a transceiver module 935 or a base station transceiver module 1250 as described with reference to FIGS. 9 and 12.

In some examples, the transmitter module 1020 may include at least one RF transmitter, such as at least one RF transmitter operable to transmit allocation information related to CB-PUSCH resources. The transmitter module 1020 may be used to transmit various types of data and/or control signals (i.e., transmissions) over one or more communication links of a wireless communication system, such as one or more communication links of the wireless communications system 100 described with reference to FIG. 1. Transmitter module 1020 may also represent examples of aspects of a transceiver module 935 or a base station transceiver module 1250 as described with reference to FIGS. 9 and 12.

In some examples, the contention-based uplink channel access module 1015 may be configured to perform contention-based resource allocation and related operations using CB-PUSCH resources and received transmissions on the CB-PUSCH resources, such as discussed above with respect to FIGS. 2-6.

Figure 11:
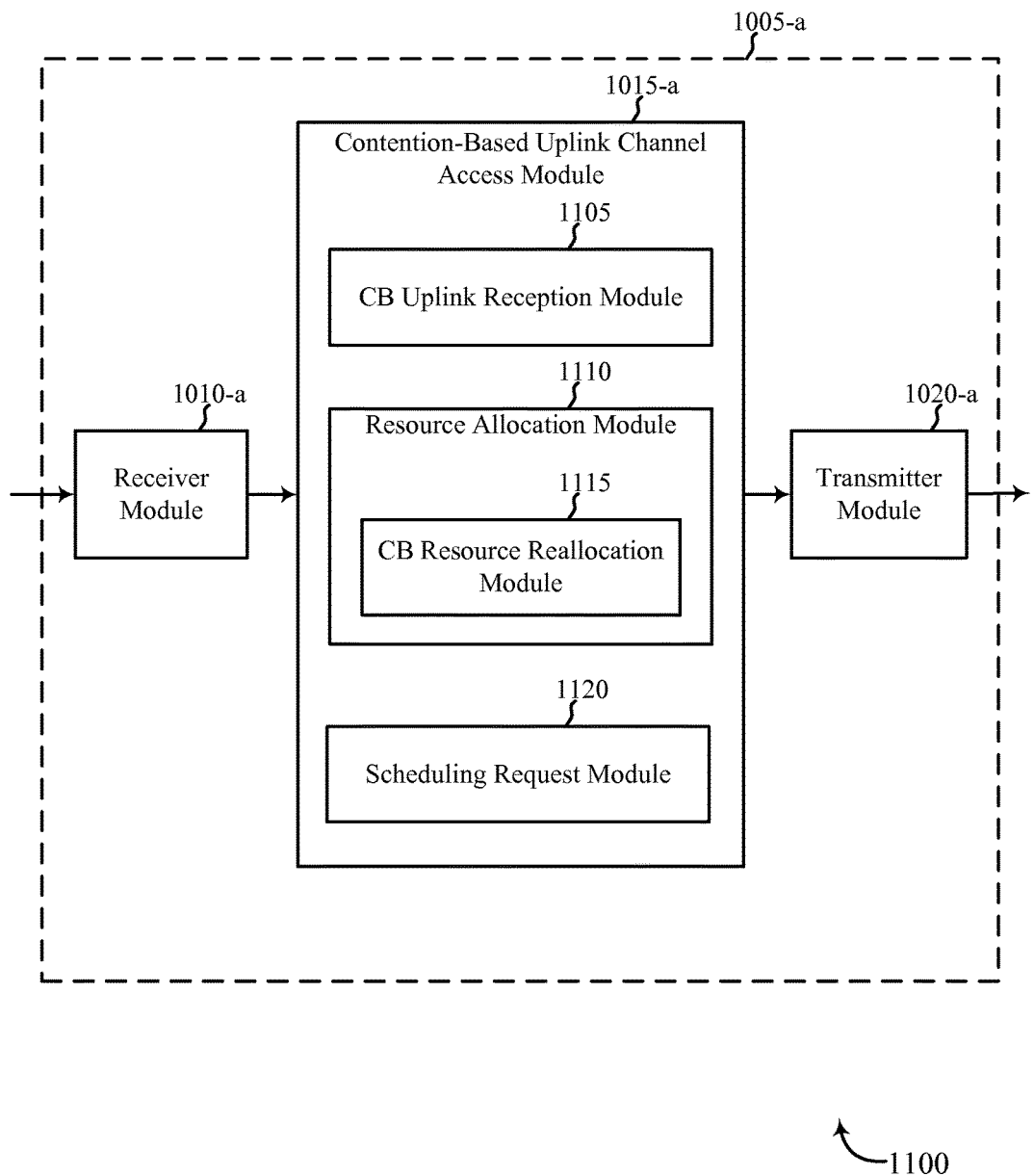
FIG. 11 shows a block diagram of an apparatus for use in wireless communication, in accordance with various aspects of the present disclosure.

FIG. 11 shows a block diagram 1100 of an apparatus 1005-*a* for use in wireless communication, in accordance with various aspects of the present disclosure. In some examples, the apparatus 1005-*a* may be an example of aspects of one or more of the base stations 105 described with reference to FIG. 1, and/or an example of aspects of the apparatus 1005 described with reference to FIG. 10. In some examples, the apparatus 1005-*a* may be part or include an LTE/LTE-A eNB and/or an LTE/LTE-A base station. The apparatus 1005-*a* may also be a processor. The apparatus 1005-*a* may include a receiver module 1010-*a*, a contention-based uplink channel access module 1015-*a*, and/or a transmitter module 1020-*a*. Each of these modules may be in communication with each other.

The components of the apparatus 1005-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010-*a* may be an example of one or more aspects of the receiver module 1010 described with reference to FIG. 10. In some examples, the receiver module 1010-*a* may include at least one radio frequency (RF) receiver, such as at least one RF receiver operable to receive CB-PUSCH transmissions. The receiver module 1010-*a* may be used to receive various types of data and/or control signals (i.e., transmissions) over one or more communication links of a wireless communication system, such as one or more communication links of the wireless communications system 100 described with reference to FIG. 1. Receiver module 1010-*a* may also represent examples of aspects of a transceiver module 935 or a base station transceiver module 1250 as described with reference to FIGS. 9 and 12.

In some examples, the transmitter module 1020-*a* may be an example of one or more aspects of the transmitter module 1020 described with reference to FIG. 10. In some examples, the transmitter module 1020-*a* may include at least one RF transmitter, such as at least one RF transmitter operable to transmit resource allocations for CB-PUSCH resources. The transmitter module 1020-*a* may be used to transmit various types of data and/or control signals (i.e., transmissions) over one or more communication links of a wireless communications system, such as one or more communication links of the wireless communications system 100 described with reference to FIG. 1. Transmitter module 1020-*a* may also represent examples of aspects of a transceiver module 935 or a base station transceiver module 1250 as described with reference to FIGS. 9 and 12.

The contention-based uplink channel access module 1015-*a* may include a contention-based uplink reception module 1105 that may receive CB-PUSCH transmissions, such as discussed above with respect to FIGS. 2-6. The resource allocation module 1110 may determine resource allocation for PUSCH resources, and may include a contention-based resource reallocation module 1115, which may act to allocate and reallocate CB-PUSCH resources in a manner similar as discussed above with respect to FIGS. 2-6. The scheduling request module 1120 may receive a scheduling request, using CB-PUSCH resources or using traditional uplink resources, in a manner similar as discussed above with respect to FIGS. 2-6.

Figure 12:
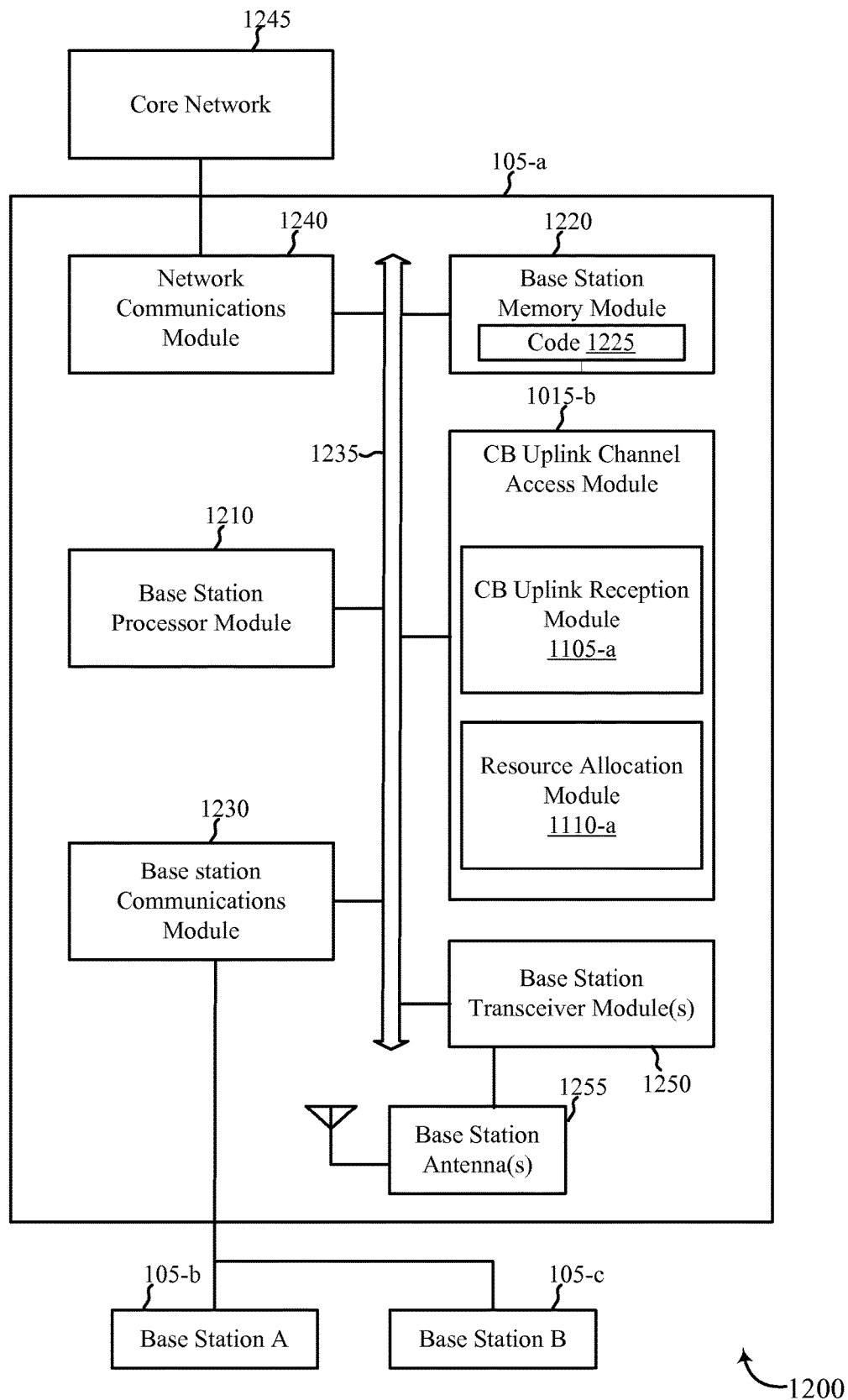
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, and/or aspects of one or more of the apparatus 1005 when configured as a base station, as described with reference to FIGS. 10 and/or 11. The base station 105-*a* may be configured to implement or facilitate at least some of the base station and/or apparatus features and functions described with reference to FIG. 1.

The base station 105-*a* may include a base station processor module 1210, a base station memory module 1220, at least one base station transceiver module (represented by base station transceiver module(s) 1250), at least one base station antenna (represented by base station antenna(s) 1255), and/or a contention-based uplink channel access module 1015-*b*. The base station 105-*a* may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., CB-PUSCH transmissions, etc.). Alternatively, the computer-readable, computer-executable software/firmware code 1225 may not be directly executable by the base station processor module 1210 but be configured to cause the base station 105-a (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-b and 105-c, and/or to the network communications module 1240 for transmission to a core network 1245, which may be an example of one or more aspects of the core network 130 described with reference to FIG. 1. The base station processor module 1210 may handle, alone or in connection with the contention-based uplink channel access module 1015-b, various aspects of CB-PUSCH resource allocation and signaling, reception of CB-PUSCH transmissions, reception and processing of SR transmissions, and/or reception and processing of BSR transmissions.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIG. 1. The base station 105-a may, for example, include multiple base station antennas 1255 (e.g., an antenna array). The base station 105-a may communicate with the core network 1245 through the network communications module 1240. The base station 105-a may also communicate with other base stations, such as the base stations 105-b and 105-c, using the base station communications module 1230.

The contention-based uplink channel access module 1015-b may be configured to perform and/or control some or all of the features and/or functions described with reference to FIGS. 2-10 related to CB-PUSCH transmissions. The contention-based uplink channel access module 1015-b, or portions of the module 1015-b, may include a processor, and/or some or all of the functions of the contention-based uplink channel access module 1015-b may be performed by the base station processor module 1210 and/or in connection with the base station processor module 1210. In some examples, the contention-based uplink channel access module 1015-b may be an example of the contention-based uplink channel access module 1015 and/or 1015-a described with reference to FIGS. 10 and/or 11.

Figure 13:
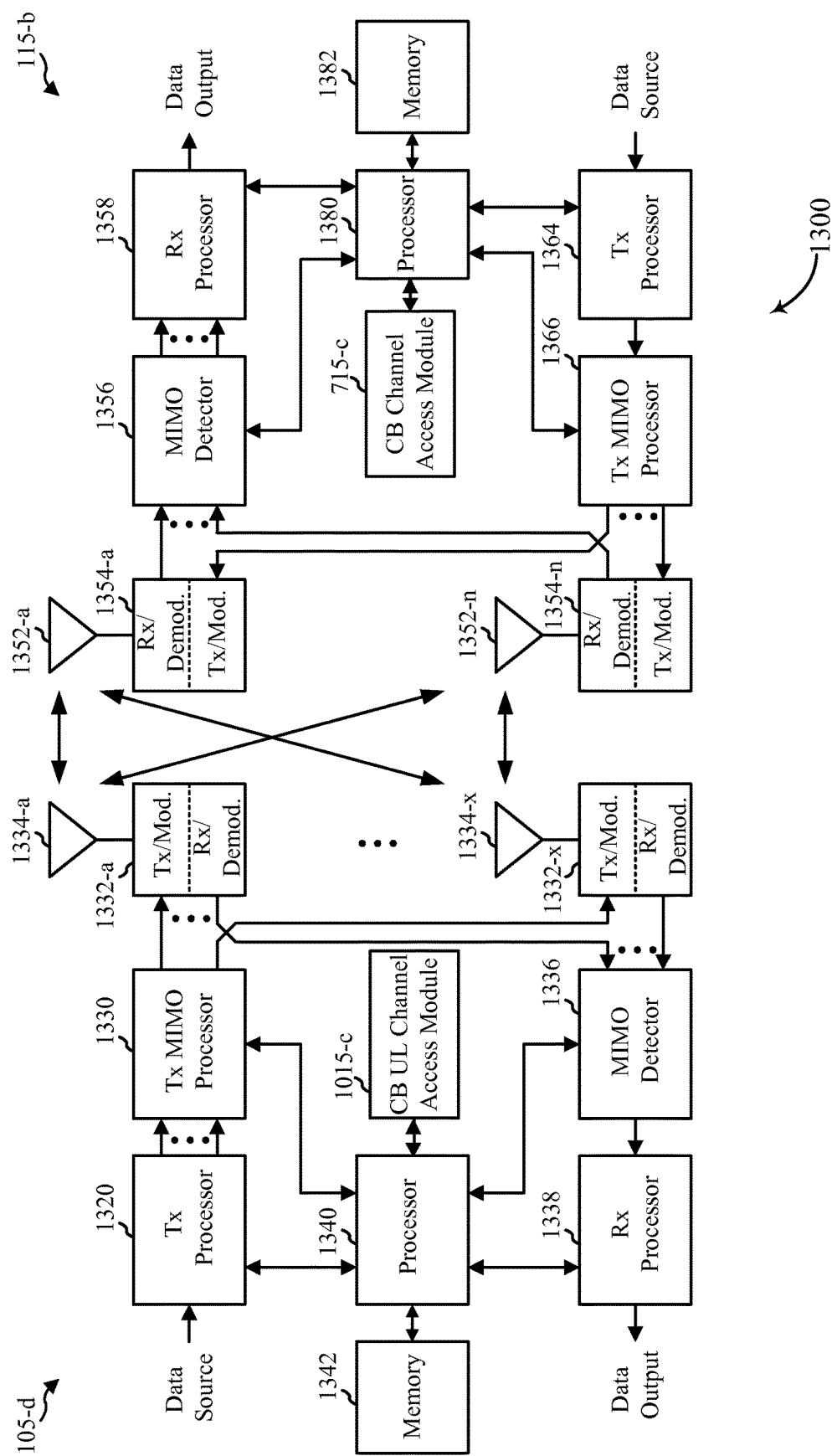
FIG. 13 shows a block diagram of a multiple-input/multiple-output communication system, in accordance with various aspects of the present disclosure.

FIG. 13 is a block diagram of a multiple input/multiple output (MIMO) communications system 1300 including a base station 105-d and a UE 115-b. The MIMO communications system 1300 may illustrate aspects of the wireless communications system 100 shown in FIG. 1. The base station 105-d may be equipped with antennas 1334-a through 1334-x, and the UE 115-b may be equipped with antennas 1352-a through 1352-n. In the MIMO communications system 1300, the base station 105-d may be able to send data over multiple communication links at the same time. Each communication link may be called a "layer" and the "rank" of the communication link may indicate the number of layers used for communication. For example, in a 2×2 MIMO communications system where base station 105-d transmits two "layers," the rank of the communication link between the base station 105-d and the UE 115-b is two.

At the base station 105-d, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the modulators/demodulators 1332-a through 1332-x. Each modulator/demodulator 1332 may process a respective output symbol stream (e.g., for OFDM, etc.) to obtain an output sample stream. Each modulator/demodulator 1332 may further process (e.g., convert to analog, amplify, filter, and upconvert) the output sample stream to obtain a DL signal. In one example, DL signals from modulators/demodulators 1332-a through 1332-x may be transmitted via the antennas 1334-a through 1334-x, respectively.

At the UE 115-b, the UE antennas 1352-a through 1352-n may receive the DL signals from the base station 105-d and may provide the received signals to the demodulators 1354-a through 1354-n, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-a through 1354-n, perform MIMO detection on the received symbols, if applicable, and provide detected symbols. A receive processor 1358 may process (e.g., demodulate, deinterleave, and decode) the detected symbols, providing decoded data for the UE 115-b to a data output, and provide decoded control information to a processor 1380, or memory 1382.

The processor 1380 may in some cases execute stored instructions to instantiate one or more of a contention-based channel access module 715-c. The contention-based channel access module 715-c may be an example of aspects of the contention-based channel access module 715 described with reference to FIGS. 7, 8 and/or 9.

On the uplink (UL), at the UE 115-b, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-a through 1354-n (e.g., for SC-FDMA, etc.), and be transmitted to the base station 105-d in accordance with the transmission parameters received from the base station 105-d. At the base station 105-d, the UL signals from the UE 115-b may be received by the antennas 1334, processed by the modulators/demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a contention-based uplink channel access module 1015-*c*. The contention-based uplink channel access module 1015-*c* may be an example of aspects of the contention-based uplink channel access module 1015 described with reference to FIGS. 10, 11 and/or 12.

The components of the UE 115-*b* may, individually or collectively, be implemented with one or more ASICs adapted to perform some or all of the applicable functions in hardware. Each of the noted modules may be a means for performing one or more functions related to operation of the MIMO communications system 1300. Similarly, the components of the base station 105-*c* may, individually or collectively, be implemented with one or more ASICs adapted to perform some or all of the applicable functions in hardware. Each of the noted components may be a means for performing one or more functions related to operation of the MIMO communications system 1300.

Figure 14:
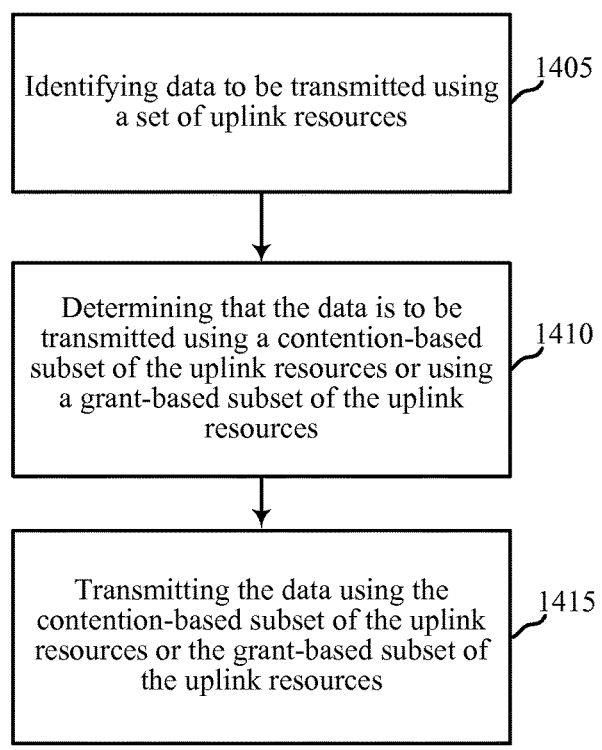
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 9 and/or 13, and/or aspects of device 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include identifying data to be transmitted using a set of uplink resources. The operation(s) at block 1405 may be performed using the contention-based channel access module 715 described with reference to FIGS. 7-9 and/or 13.

At block 1410, the method 1400 may include determining that the data is to be transmitted using a contention-based subset of the uplink resources or using a grant-based subset of the uplink resources. The operation(s) at block 1410 may be performed using the contention-based channel access module 715 described with reference to FIGS. 7-9 and/or 13.

At block 1415, the method 1400 may include transmitting the data using the contention-based subset of the uplink resources or the grant-based subset of the uplink resources. The operation(s) at block 1415 may be performed using the contention-based channel access module 715 described with reference to FIGS. 7-9 and/or 13.

At block 1420, the method 1400 may include autonomously transmitting the data using the identified CB-PUSCH resources. The operation(s) at block 1420 may be performed using the contention-based channel access module 715 described with reference to FIGS. 7-9 and/or 13.

Thus, the method 1400 may provide for wireless communication. It should be noted that the method 1400 is just one implementation and that the operations of the method 1400 may be rearranged or otherwise modified such that other implementations are possible.

Figure 15:
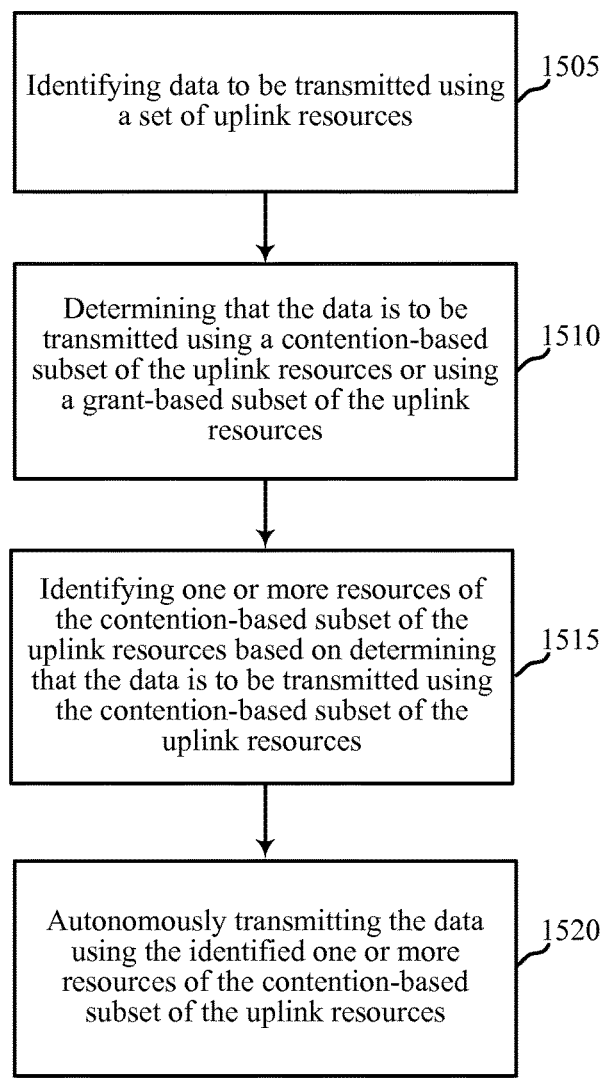
FIG. 15 is a flow chart illustrating an example of another method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 9 and/or 13, and/or aspects of device 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include identifying data to be transmitted using a set of uplink resources. The operation(s) at block 1505 may be performed using the contention-based channel access module 715 described with reference to FIGS. 7-9 and/or 13.

At block 1510, the method 1500 may include determining that the data is to be transmitted using a contention-based subset of the uplink resources or using a grant-based subset of the uplink resources. The operation(s) at block 1510 may be performed using the contention-based channel access module 715 described with reference to FIGS. 7-9 and/or 13.

At block 1515, the method 1500 may identify one or more resources of the contention-based subset of the uplink resources based on determining that the data is to be transmitted using the contention-based subset of the uplink resources. The operation(s) at block 1515 may be performed using the contention-based channel access module 715 described with reference to FIGS. 7-9 and/or 13.

At block 1520, the method 1500 may autonomously transmit the data using the identified one or more resources of the contention-based subset of the uplink resources. The operations at block 1520 may be performed using the contention-based channel access module 715 described with reference to FIGS. 7-9 and/or 13.

Thus, the method 1500 may provide for wireless communication. It should be noted that the method 1500 is just one implementation and that the operations of the method 1500 may be rearranged or otherwise modified such that other implementations are possible. In some examples, the method 1500 may include transmitting an SR using an uplink control channel based on determining that the data is to be transmitted using the grant-based subset of the uplink resources, and the method may include receiving an uplink grant allocating the grant-based subset of the uplink resources to transmit the data. Alternatively, the method 1500 may include identifying one or more resources of the contention-based subset of the uplink resources based on determining that the data is to be transmitted using the contention-based subset of the uplink resources, and the method 1500 may include transmitting the data using the identified one or more resources of the contention-based subset of the uplink resources.

The method 1500 may also include determining a modulation and coding scheme (MCS) for transmitting the data based on the contention-based subset of the uplink resources. In some cases, the method 1500 includes determining a transmit power from a set of available transmit powers for transmitting the data based on the contention-based subset of the uplink resources.

In some examples of the method 1500, determining that the data is to be transmitted using the content-based subset of the uplink resources includes determining that an elapsed time since an SR was transmitted exceeds a threshold and then determining to transmit the data using the contention-based subset of the uplink resources based on determining that the elapsed time exceeds the threshold.

In some case, identifying the one or more resources of the contention-based subset of the uplink resources includes identifying one or more allocated bins for contention-based uplink transmissions, and then selecting a bin of the one or more allocated bins for transmitting the data.

Selecting the bin of the one or more allocated bins may include randomly selecting the bin from a plurality of allocated bins. Or, in some cases, selecting the bin of the one or more allocated bins includes identifying one or more characteristics of the data to be transmitted and selecting the bin based on the one or more characteristics. The one or more characteristics may include, for instance, an amount of data to be transmitted, a type of traffic associated with the data to be transmitted, or a source of the data to be transmitted, or any combination thereof. Additionally or alternatively, the method 1500 may include receiving signaling indicating the one or more allocated bins, wherein the signaling comprises at least one of RRC signaling, a system information block (SIB), or physical downlink control channel (PDCCH) signaling, or any combination thereof.

In some examples, the method 1500 includes receiving a set of RNTIs, determining a RNTI from the set of RNTIs to be used for monitoring a PDCCH, and then monitoring the PDCCH for the determined RNTI. The one or more resources of the contention-based subset of the uplink resources may be identified based on the monitoring, for instance.

In some examples of the method 1500, the data includes a data payload, an identification of a device transmitting the data, or a buffer status report indicating an amount of data that is to be transmitted, or any combination thereof. Additionally or alternatively, the method 1500 may include determining that a negative acknowledgment message or that no acknowledgement message is received in response to transmitting the data using the contention-based subset of the uplink resources, and it may include transmitting a scheduling request associated with the data based at least in part on determining that the negative acknowledgment message or that no acknowledgment message is received.

According to some examples of the method 1500, the data includes a BSR that indicates an amount of data to be transmitted and an identifier of a device transmitting the BSR. Additionally or alternatively, the method 1500 may include determining that a buffer status report (BSR) is to be transmitted using the contention-based subset of the uplink resources, and it may include autonomously transmitting the BSR using the contention-based subset of the uplink resources.

The BSR may be transmitted using an identified BSR resource within the contention-based subset of the uplink resources. In some examples, wherein the identified BSR resource include one code division multiplexing (CDM) code over one resource block of the contention-based subset of the uplink resources. The method 1500 may also include receiving an uplink grant responsive to the BSR transmission based on an unsuccessful transmission of the data using the contention-based subset of the uplink resources. The BSR may be transmitted when data to be transmitted exceeds a threshold amount of data for transmission using the contention-based subset of the uplink resources, for instance. Additionally or alternatively, the method 1500 may include receiving an uplink grant allocating one or more resources of the grant-based subset of the uplink resources responsive to the transmission of the BSR.

Figure 16:
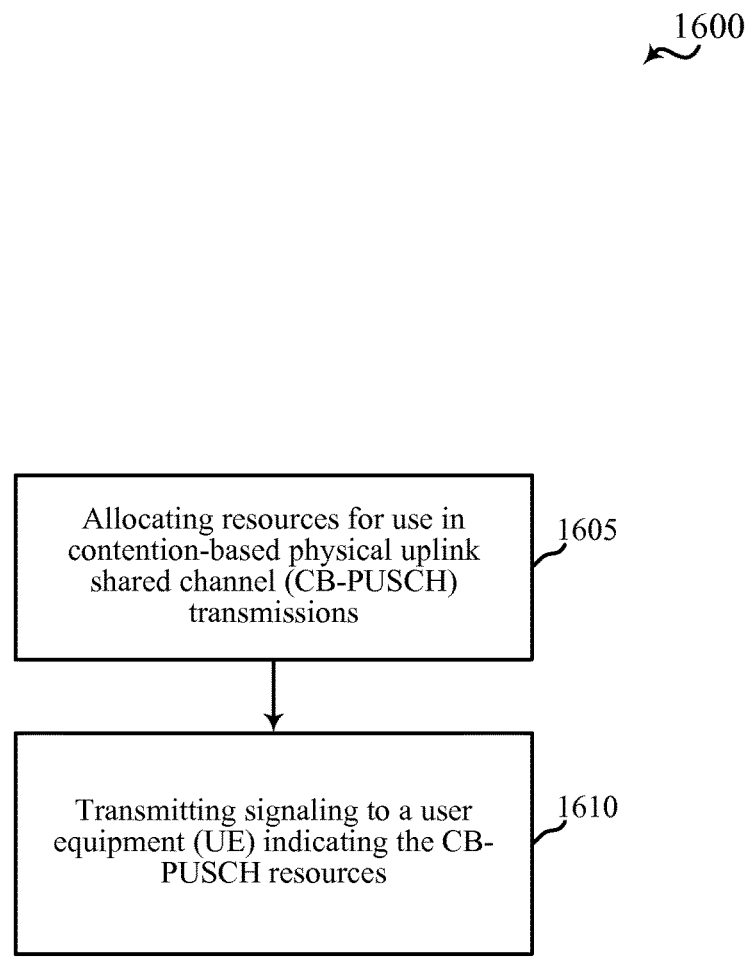
FIG. 16 is a flow chart illustrating an example of another method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1, 12 and/or 13, and/or aspects of one or more of the apparatus 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1605, the method 1600 may include allocating resources for use in contention-based physical uplink shared channel (CB-PUSCH) transmissions. The operation(s) at block 1605 may be performed using the contention-based uplink channel access module 1015 described with reference to FIGS. 10-13.

At block 1610, the method 1600 may include transmitting signaling to a user equipment (UE) indicating the CB-PUSCH resources. The operation(s) at block 1610 may be performed using the contention-based uplink channel access module 1015 described with reference to FIGS. 10-13.

Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1400-1600 may be combined. It should be noted that the methods 1400, 1500, 1600 are just example implementations, and that the operations of the methods 1400-1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying data to be transmitted using a set of uplink resources;
   determining that an elapsed time since a prior scheduling request (SR) was transmitted exceeds a threshold;
   determining that the data is to be transmitted using a contention-based subset of the uplink resources based at least in part on determining that the elapsed time exceeds the threshold; and
   transmitting the data using the contention-based subset of the uplink resources.

2. The method of claim 1, further comprising:
   identifying one or more resources of the contention-based subset of the uplink resources based at least in part on determining that the data is to be transmitted using the contention-based subset of the uplink resources; and
   autonomously transmitting the data using the identified one or more resources of the contention-based subset of the uplink resources.

3. The method of claim 2, further comprising:
   determining a modulation and coding scheme (MCS) for transmitting the data based at least in part on the contention-based subset of the uplink resources.

4. The method of claim 2, further comprising:
   determining a transmit power from a set of available transmit powers for transmitting the data based at least in part on the contention-based subset of the uplink resources.

5. The method of claim 2, wherein identifying the one or more resources of the contention-based subset of the uplink resources comprises:
   identifying one or more allocated bins for contention-based uplink transmissions; and
   selecting a bin of the one or more allocated bins for transmitting the data.

6. The method of claim 5, wherein selecting the bin of the one or more allocated bins comprises:
   randomly selecting the bin from a plurality of allocated bins.

7. The method of claim 5, wherein selecting the bin of the one or more allocated bins comprises:
   identifying one or more characteristics of the data to be transmitted; and
   selecting the bin based at least in part on the one or more characteristics.

8. The method of claim 7, wherein the one or more characteristics comprise at least one of an amount of data to be transmitted, a type of traffic associated with the data to be transmitted, or a source of the data to be transmitted, or any combination thereof.

9. The method of claim 5, further comprising:
   receiving signaling indicating the one or more allocated bins, wherein the signaling comprises at least one of RRC signaling, a system information block (SIB), or physical downlink control channel (PDCCH) signaling, or any combination thereof.

10. The method of claim 2, further comprising:
    receiving a set of radio network temporary identifiers (RNTIs);
    determining a RNTI from the set of RNTIs to be used for monitoring a physical downlink control channel (PDCCH); and
    monitoring the PDCCH for the determined RNTI; and
    wherein the one or more resources of the contention-based subset of the uplink resources is identified based at least in part on the monitoring.

11. The method of claim 1, wherein the data comprises at least one of a data payload, an identification of a device transmitting the data, or a buffer status report indicating an amount of data that is to be transmitted, or any combination thereof.

12. The method of claim 1, further comprising:
    determining that a negative acknowledgment message or that no acknowledgement message is received in response to transmitting the data using the contention-based subset of the uplink resources; and
    transmitting another SR associated with the data based at least in part on determining that the negative acknowledgment message or that no acknowledgment message is received.

13. The method of claim 1, wherein the data comprises a buffer status report (BSR) that indicates an amount of data to be transmitted and an identifier of a device transmitting the BSR.

14. The method of claim 1, further comprising:
    determining that a buffer status report (BSR) is to be transmitted using the contention-based subset of the uplink resources; and
    autonomously transmitting the BSR using the contention-based subset of the uplink resources.

15. The method of claim 14, wherein the BSR is transmitted using an identified BSR resource within the contention-based subset of the uplink resources.

16. The method of claim 15, wherein the identified BSR resource comprises one code division multiplexing (CDM) code over one resource block of the contention-based subset of the uplink resources.

17. The method of claim 14, further comprising:
    receiving an uplink grant responsive to the BSR transmission based at least in part on an unsuccessful transmission of the data using the contention-based subset of the uplink resources.

18. The method of claim 14, wherein the BSR is transmitted when data to be transmitted exceeds a threshold amount of data for transmission using the contention-based subset of the uplink resources.

19. The method of claim 14, further comprising:
    receiving an uplink grant allocating one or more resources of a grant-based subset of the uplink resources responsive to the transmission of the BSR.

20. The method of claim 1, further comprising:
    determining that the contention-based subset of the uplink resources supports a concurrent scheduling request (SR) associated with the data; and
    transmitting the SR concurrently with the data using the contention-based subset of the uplink resources.

21. An apparatus for wireless communication, comprising:
    a processor;
    memory in electronic communication with the processor; and
    instructions stored in the memory, the instructions being executable by the processor to:
    identify data to be transmitted using a set of uplink resources;
    determine that an elapsed time since a prior scheduling request (SR) was transmitted exceeds a threshold;
    determine that the data is to be transmitted using a contention-based subset of the uplink resources based at least in part on determining that the elapsed time exceeds the threshold; and
    transmit the data using the contention-based subset of the uplink resources.

22. The apparatus of claim 21, wherein the instructions are operable to cause the apparatus to:
    identify one or more resources of the contention-based subset of the uplink resources based at least in part on determining that the data is to be transmitted using the contention-based subset of the uplink resources; and
    autonomously transmit the data using the identified one or more resources of the contention-based subset of the uplink resources.

23. The apparatus of claim 21, wherein the instructions are operable to cause the apparatus to:
    determine that a buffer status report (BSR) is to be transmitted using the contention-based subset of the uplink resources; and
    autonomously transmit the BSR using the contention-based subset of the uplink resources.

24. The apparatus of claim 21, wherein the instructions are operable to cause the apparatus to:
    determine that the contention-based subset of the uplink resources supports a concurrent scheduling request (SR) associated with the data; and
    transmit the SR concurrently with the data using the contention-based subset of the uplink resources.

25. An apparatus for wireless communication, comprising:
    means for identifying data to be transmitted using a set of uplink resources;
    means for determining that an elapsed time since a prior scheduling request (SR) was transmitted exceeds a threshold;
    means for determining that the data is to be transmitted using a contention-based subset of the uplink resources based at least in part on determining that the elapsed time exceeds the threshold; and
    means for transmitting the data using the contention-based subset of the uplink resources.

26. A non-transitory computer-readable medium storing computer-executable code for wireless communication, the code comprising instructions executable to:

identify data to be transmitted using a set of uplink resources;
determine that an elapsed time since a prior scheduling request (SR) was transmitted exceeds a threshold;
determine that the data is to be transmitted using a contention-based subset of the uplink resources based at least in part on determining that the elapsed time exceeds the threshold; and
transmit the data using the contention-based subset of the uplink resources.

* * * * *